(12) United States Patent
Saikusa

(10) Patent No.: US 6,931,013 B2
(45) Date of Patent: Aug. 16, 2005

(54) PON TRANSMISSION SYSTEM AND DYNAMIC BAND ASSIGNMENT SYSTEM TO BE EMPLOYED IN THE SAME

(75) Inventor: Naoki Saikusa, Tokyo (JP)

(73) Assignee: NEC Corporation, Tokyo (JP)

( * ) Notice: Subject to any disclaimer, the term of this patent is extended or adjusted under 35 U.S.C. 154(b) by 911 days.

(21) Appl. No.: 09/760,775

(22) Filed: Jan. 17, 2001

(65) Prior Publication Data

US 2001/0008455 A1 Jul. 19, 2001

(30) Foreign Application Priority Data

Jan. 19, 2000 (JP) .................................... 2000-009604

(51) Int. Cl.[7] .......................... H04L 12/28; H04J 14/00
(52) U.S. Cl. ............................. 370/395.4; 370/395.43; 370/412; 398/45; 398/49
(58) Field of Search ................................ 370/412, 468, 370/253, 230.1, 231, 232, 395.1, 395.21, 395.4, 395.41, 395.43, 410

(56) References Cited

U.S. PATENT DOCUMENTS

| | | | |
|---|---|---|---|
| 5,191,583 A | * 3/1993 | Pearson et al. | ............. 370/242 |
| 5,463,620 A | * 10/1995 | Sriram | ....................... 370/412 |
| 5,544,170 A | * 8/1996 | Kasahara | ................... 370/253 |
| 6,317,234 B1 | * 11/2001 | Quayle | ........................... 398/9 |
| 6,519,255 B1 | * 2/2003 | Graves | ........................ 370/392 |
| 6,658,023 B1 | * 12/2003 | Omori et al. | ................ 370/468 |

FOREIGN PATENT DOCUMENTS

| | | |
|---|---|---|
| JP | 11-122279 A | 4/1999 |
| JP | 11-146000 A | 5/1999 |
| JP | 11-341037 A | 12/1999 |
| JP | 2000-332808 A | 11/2000 |
| JP | 2000-358041 A | 12/2000 |

* cited by examiner

*Primary Examiner*—Hanh Nguyen
(74) *Attorney, Agent, or Firm*—Sughrue Mion, PLLC

(57) ABSTRACT

A PON transmission system and a dynamic band assignment system to be employed in the same which permits high speed band variation, to effectively use up band in PDS period, and to adapt to variation of traffic type. The PON transmission system includes a plurality of subscriber unit including optical network unit processing portions for terminating an optical communication network and a station unit including optical line terminal processing portion terminating the optical communication network. The system also includes means for monitoring increasing and decreasing of idle cells, means for recognizing accumulation of cell in the optical network unit processing portion depending upon the result of monitoring, and means for individually handling band process in the optical communication network according to necessary or unnecessary of band restriction depending upon traffic type.

10 Claims, 25 Drawing Sheets

FIG.13

| OCTET | CONTENTS | VENDOR_SPECIFIC MESSAGE |
|---|---|---|
| | | DESCRIPTION |
| 35 | xxxxxxxx | INDICATES ONU SOURCING THIS MESSAGE |
| 36 | 01111zzz | MESSAGE IDENTIFICATION "VENDER_SPECIFIC" |
| 37 | n1 | NUMBER OF REGION FOR BAND RESTRICTED CELL |
| 38 | m1 | NUMBER OF REGION FOR NON-BAND RESTRICTED CELL |
| 39 | n2 | NUMBER OF REGION FOR BAND RESTRICTED CELL |
| 40 | m2 | NUMBER OF REGION FOR NON-BAND RESTRICTED CELL |
| 41 | n3 | NUMBER OF REGION FOR BAND RESTRICTED CELL |
| 42 | m3 | NUMBER OF REGION FOR NON-BAND RESTRICTED CELL |
| 43 | n4 | NUMBER OF REGION FOR BAND RESTRICTED CELL |
| 44 | m4 | NUMBER OF REGION FOR NON-BAND RESTRICTED CELL |
| 45 | 00000000 | COMMAND REPEATING |
| 46 | UNSPECIFIED | |

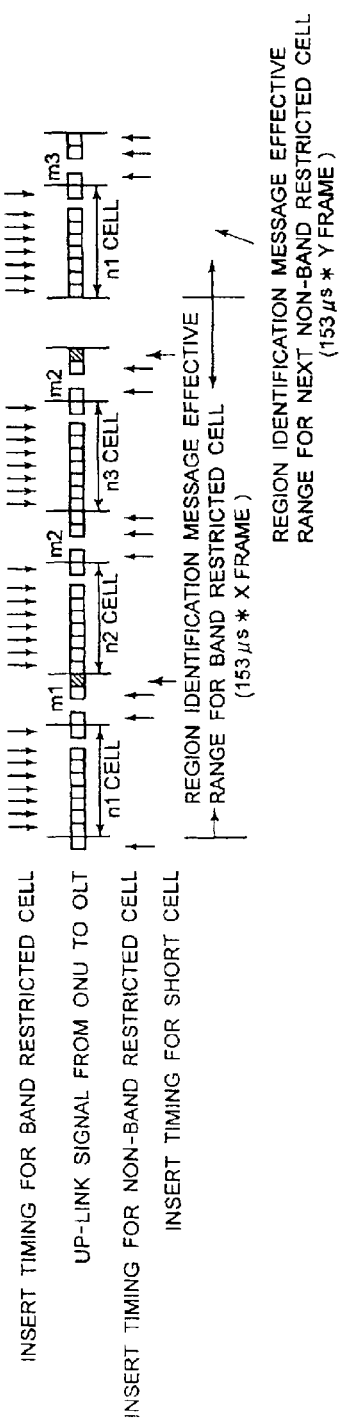

INSERT TIMING FOR BAND RESTRICTED CELL
UP-LINK SIGNAL FROM ONU TO OLT
INSERT TIMING FOR NON-BAND RESTRICTED CELL
INSERT TIMING FOR SHORT CELL

REGION IDENTIFICATION MESSAGE EFFECTIVE RANGE FOR BAND RESTRICTED CELL (153 μs * X FRAME)

REGION IDENTIFICATION MESSAGE EFFECTIVE RANGE FOR NEXT NON-BAND RESTRICTED CELL (153 μs * Y FRAME)

FIG.14

| OCTET | CONTENT | GRANT_ALLOCATION MESSAGE |
|---|---|---|
| | | DESCRIPTION |
| 35 | PON_ID | DIRECTED MESSAGE TO ONE ONU |
| 36 | 00001010 | MESSAGE IDENTIFICATION "GRANT_ALLOCATION" |
| 37 | dddddddd | DATA GRANT ALLOCATED TO THE ONU WITH THIS PON_ID |
| 38 | 0000000a | a:1 = ACTIVATE DATA GRANT FOR THIS ONU<br>a:0 = DEACTIVATE DATA GRANT FOR THIS ONU |
| 39 | pppppppp | PLOAM GRANT ALLOCATED TO THE ONU WITH THIS PON_ID |
| 40 | 0000000a | a:1 = ACTIVATE PLOAM GRANT FOR THIS ONU<br>a:0 = DEACTIVATE PLOAM GRANT FOR THIS ONU |
| 41 | dddddddd | DATA GRANT ALLOCATED TO THE ONU WITH THIS PON_ID |
| 42 | 0000000a | a:1 = ACTIVATE DATA GRANT FOR THIS ONU<br>a:0 = DEACTIVATE DATA GRANT FOR THIS ONU |
| 43, 46 | UNSPECIFIED | |

GRANT FOR BAND RESTRICTED CELL

GRANT FOR NON-BAND RESTRICTED CELL

INSERT TIMING FOR
BAND RESTRICTED CELL

UP-LINK SIGNAL FROM
ONU TO OLT

INSERT TIMING FOR
NON-BAND RESTRICTED CELL

INSERT TIMING FOR SHORT CELL

PON TRANSMISSION SYSTEM AND DYNAMIC BAND ASSIGNMENT SYSTEM TO BE EMPLOYED IN THE SAME

BACKGROUND OF THE INVENTION

1. Field of the Invention

The present invention relates to a passive optical network (PON) transmission system and a dynamic band assignment system to be employed in the same. More particularly, the invention relates to a dynamic band assignment system in the PON transmission system.

2. Description of the Related Art

Conventionally, a PON transmission system includes an optical network unit (ONU) processing portion for terminating on the side of a subscriber unit and an optical line terminal (OLT) processing portion terminating on the side of station equipment in an optical network.

As shown in FIG. 25, the ONU processing portion 6 is constructed with a buffer 61 for band restricted cell, a buffer 62 for non-band restricted cell, a grant identifying portion 63, a reception signal separating portion 64, a transmission signal multiplying portion 65, an idle cell generating portion 66 and a short cell generating portion 67.

The reception signal separating portion 64 receives a passive double star (PDS) down-link signal 101 and outputs a grant (transmission permission) signal 165. The grant identifying portion 63 receives the grant signal 165 and outputs a read signal 164 for band restricted cell upon identification of data grant and a short cell read out signal 170 upon identification of grant of short cell.

The buffer 61 for band restricted cell receives an input band restricted cell signal 161 as input to write the cell in a buffer (not shown), receives a read signal 164 for the band restricted cell as input to output an output band restricted cell signal 168 as read signal when the cell is present in the buffer and to output a read signal 163 for the remainder band restricted cell for enabling transmission of a buffer 62 for non-band restricted cell when the cell is not present in the buffer.

The buffer 62 for non-band restricted cell takes an input non-band restricted cell signal 162 as input to write the cell in the buffer (not shown), receives the read signal 163 as input to output an output non-band restricted cell signal 169 as read out signal when the cell is present in the buffer, and to output a read out signal 166 for the remainder non-band restricted cell when the cell is not present in the buffer.

The idles cell generating portion 66 takes the read signal 166 for the remainder non-band restricted cell to generate an idle cell for inserting in a remainder band to output an output idle cell signal 167. The short cell generating portion 67 takes the short cell read out signal 170 and a grant demand number signal 172 to generate a short cell at a read out timing of the short cell read out signal 170 to output an output short cell signal 171 to reset.

The transmission signal multiplexing portion 65 receives the output band restricted cell signal 168, the output non-band restricted cell signal 169, the idle cell signal 167 and an output short cell signal 171 and outputs a PDS up-link signal 102 by multiplexing the input signals.

As shown in FIG. 26, the OLT processing portion 7 is constructed with a reception signal processing portion 71, a short cell receiving portion 72, a grant generating portion 73 for the band restricted cell, a grant multiplexing portion 74, a transmission signal multiplexing portion 75 and a short cell grant generating portion 76.

The reception signal processing portion 71 receives a PDS up-link signal 103 and outputs an ONU identification number signal 173 and a short cell signal 171 per each cell. The short cell receiving portion 172 takes the ONU identification number signal 173 and the short cell signal 171 as inputs and outputs the grant demand number signal 172 by separating the grant demand number from the short cell.

The short grant generating portion 76 takes the short cell grant read out signal 176 as input and outputs the short cell grant signal 177. The grant generating portion 73 for band restricted cell takes the grant read out signal 174 for band restricted cell as input and outputs a grant signal 175 for band restriction cell.

The grant multiplexing portion 74 outputs the grant read out signal 174 for band restricted cell and the short cell grant read out signal 176, takes the grant signal 175 for band restricted cell and the short cell grant signal 177 as input to output the grant signal 178 as short cell grant. The transmission signal multiplexing portion 75 takes the grant signal 178 as input and outputs the PDS down-link signal 104.

In the conventional PON transmission system, when attempt is made to process a traffic required band restriction and a traffic unnecessary for band restriction in a single grant, high precision band assignment is necessary for the traffic which does not require band restriction equivalent to that for the traffic requiring the band restriction, and the process is complicate unless the band updating speed is adapted to a period of the traffic requiring band restriction.

On the other hand, in the conventional PON transmission system, when increasing and decreasing of the band updating speed by number of single grant irrespective of cell necessary for band restriction, UPC and shaper are required in ONU processing portion. Therefore, the conventional PON transmission system cannot assign the band at high speed.

Furthermore, in the conventional PON transmission system, a transmission method of the short cell or hand shake are not defined. Namely, no means for dynamically varying band between the ONU identification numbers is not defined.

Also, in the conventional PON transmission system, even if excessive packet cells are input in the ONU, irrespective whether the packet can be process or not in the OLT, the PDS has to acquire the band therefor.

SUMMARY OF THE INVENTION

The present invention has been worked out in view of the problem set forth above. It is therefore an object of the present invention to provide a PON transmission system and a dynamic band assignment system to be employed in the same which permits high speed band variation, to effectively use up band in PDS section, and to adapt to variation of traffic type.

According to the first aspect of the present invention, a passive optical network transmission system comprises:

a plurality of subscriber unit including optical network unit processing portions for terminating an optical communication network;

a station unit including optical line terminal processing portion terminating the optical communication network;

means for monitoring increasing and decreasing of idle cells;

means for recognizing accumulation of cell in the optical network unit processing portion depending upon the result of monitoring; and means for individually handling band process in the optical communication network according to necessary or unnecessary of band restriction depending upon traffic type.

According to the second aspect of the present invention, a dynamic band assignment method in a passive optical network transmission system including a plurality of subscriber unit including optical network unit processing portions for terminating an optical communication network and a station unit including optical line terminal processing portion terminating the optical communication network, comprises the steps of monitoring increasing and decreasing of idle cells;

recognizing accumulation of cell in the optical network unit processing portion depending upon the result of monitoring; and individually handling band process in the optical communication network according to necessary or unnecessary of band restriction depending upon traffic type.

Namely, the dynamic band assignment method of the passive optical network transmission system according to the present invention enables to vary the band at high speed, to effectively use the up band in the PDS period and to adapt to variation of the traffic type by monitoring increasing and decreasing of the idle cell, recognizing accumulation of the cell in the ONU processing portion depending upon the result of monitoring and individually handling the band process in the optical communication network according to necessary and unnecessary of the band restriction by the traffic type.

More particularly, in the passive optical network transmission system according to the present invention, a grant generating portion for the non-band restricted cell is provided with a function for monitoring increasing and decreasing of idle cell by an idle cell detecting portion by assigning extra band constantly.

In the passive optical network transmission system, the optical line terminal processing portion may further include means for discriminating the transmission permission for permitting individual process of traffic requiring band restriction and traffic not requiring band restriction.

In the passive optical network transmission system includes means for notifying stop of transmission of internet protocol packet information which cannot be process by station unit.

By this, in the passive optical network transmission system according to the present invention, variation of and at high speed in passive double star is possible to enhance statistical multiplexing effect for the traffic of subscriber presenting in physically distant site.

In the passive optical network transmission system, by performing the process for the cells requiring band restriction and the cells not requiring band restriction separately, the process for the cells not requiring the band restriction can be simplified to enable speed up. Furthermore, by preliminarily assigning the extra bands and monitoring decreasing of the idle cell, necessary band can be recognized instantly to accommodate response delay up to a band variation timing. Furthermore, increasing and decreasing of use ratio of the extra band is estimated as a function to determine assignment of next grant. Thus, variation of band can be done at high speed.

In the passive optical network transmission system, since the acceptance is not preliminarily performed for the packet which is not possible to process, when the packet process is performed by the optical line terminal, number of packet should be finite number in most case. This is because that the identifier of the internet protocol packet can be possible greater in number than the number of the identifier of the ATM cells, and total number of the ATM cell is restricted in view of the cost. Therefore, it the packets are accepted on the side of the optical line terminal in excessive number, it simply waist the band of the passive double star and cannot be processed.

Also, even when the short cell is not present, dynamic band assignment can be possible with monitoring the idle cell. Therefore, it is possible to feed the short cell only as required to make it unnecessary to regularly perform polling.

Furthermore, number of grant for next assignment can be varied using function for increasing and decreasing of the idle cells or increasing or decreasing of cell accumulation amount in the ONU, it facilitates adaptation for variation of the traffic type. Furthermore, since the band can be varied at high speed, it becomes possible to design the buffer of ONU with smaller or reduced number.

In the passive optical network transmission system according to the present invention, with the construction set forth above, band variation at high speed becomes possible to effectively use the up band in the PDS period and to adapt to variation of the traffic type by monitoring increasing and decreasing of the idle cell, recognizing accumulation of the cell in the ONU processing portion depending upon the result of monitoring and individually handling the band process in the optical communication network according to necessary and unnecessary of the band restriction by the traffic type.

In the preferred construction, the optical line terminal processing portion may further includes means for setting weighting function for estimating variation of the traffic. Also, the optical line terminal may include means for notifying the subscriber unit stopping transmission for packet information.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 13 is an illustration showing a relationship between a region identification message for non-band restricted cell and a timing chart in the grant identifying portion of FIG. 4;

FIG. 14 is an illustration showing a relationship between a region identification message for non-band restricted cell and a timing chart in the grant identifying portion of FIG. 5;

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details.

Figure 1:
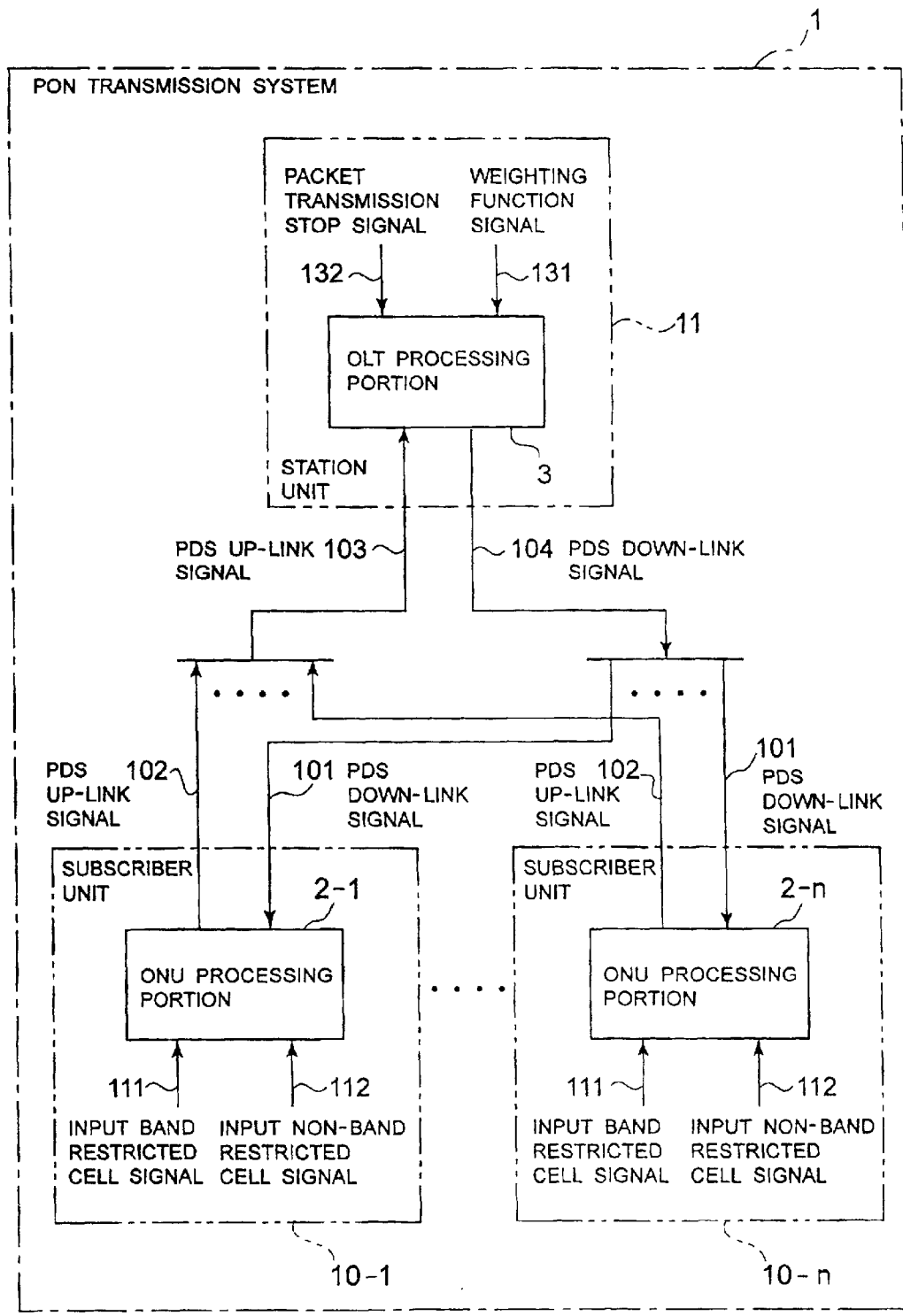
FIG. 1 is a block diagram showing a construction of one embodiment of a packet cell processing apparatus according to the present invention.

FIG. 1 is a block diagram showing a construction of one embodiment of a passive optical network (PON) transmission system according to the present invention. In FIG. 1, the PON transmission system 1 is constructed with optical network unit processing portions 2-1 to 2-n terminating an optical communication network on the side of subscriber units 10-1 to 10-n, and an optical line terminal (OLT) processing portion 3 terminating the optical communication network on the side of station equipment 11.

Figure 2:
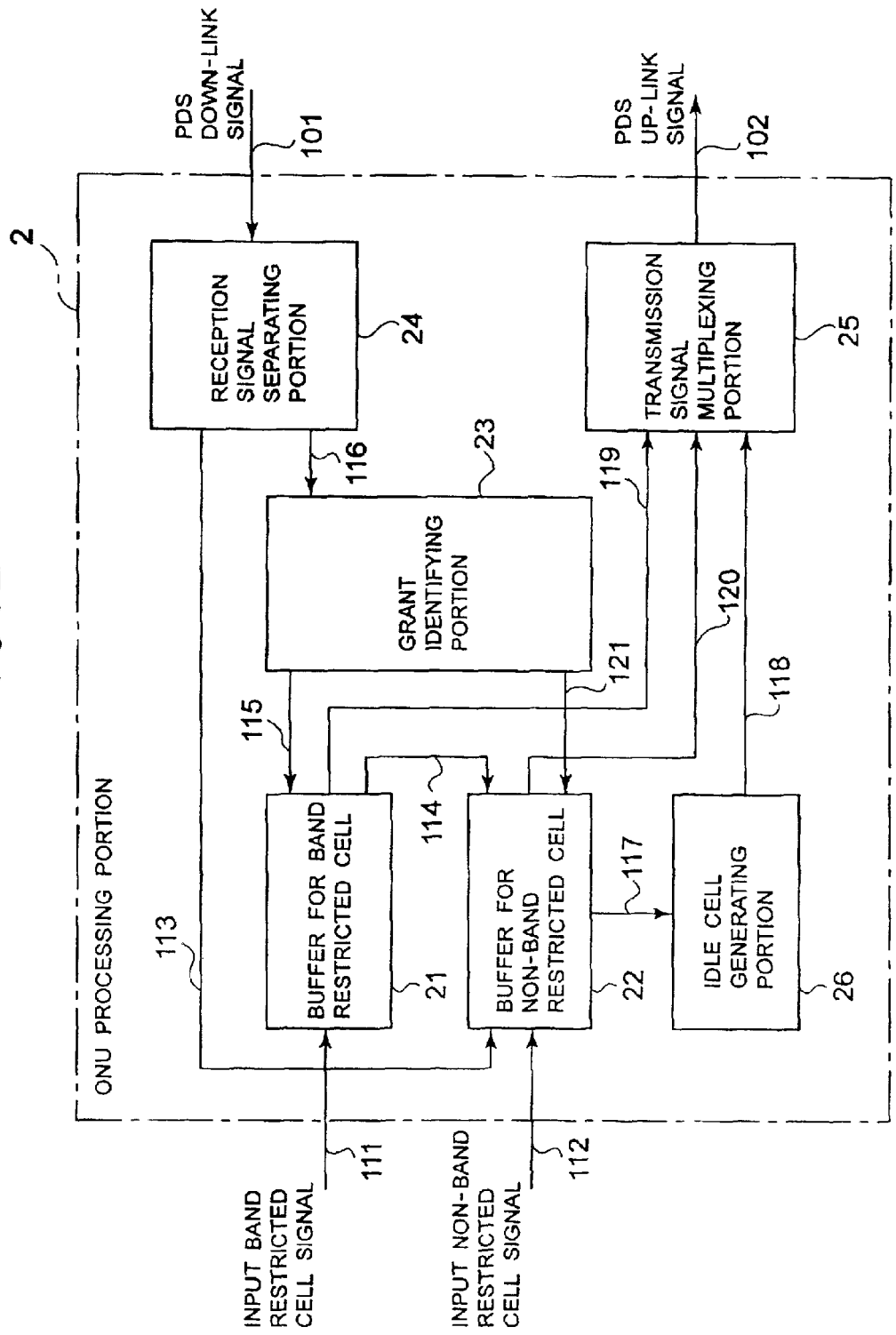
FIG. 2 is a block diagram showing a construction of an ONU processing portion of FIG. 1.

FIG. 2 is a block diagram showing a construction of the ONU processing portion 2 of FIG. 1. In FIG. 2, the ONU processing portion 2 is constructed with a buffer 21 for band restricted cell, a buffer 22 for non-band restricted cell, the grant identifying portion 23, the reception signal separating portion 24, the transmission signal multiplexing portion 25 and the idle cell generating portion 26.

The reception signal separating portion 24 takes PDS down-link signal 101 as input, outputs a packet transmission stop signal 113 by separating information indicative of enabling and disabling of new packet transmission among IDENT byte periodically arranged in PDS down frame, and outputs grant signal group 116 separating a grant (transmission permission) information and a region identification message for band restricted cell.

The grant identifying portion 23 takes the grant signal group 116 as input, outputs a read out signal 115 for band restricted cell when grant for band restricted cell is identified from the grant information and the region identification message for band restriction cell, and output the read out signal 121 for band restricted cell upon identification of grant for non-band restricted cell.

The buffer 21 for band restricted cell receives the input band restricted cell signal 111 to write in the cell in the buffer (not shown). On the other hand, the buffer 21 for band restricted cell takes the read out signal 115 for band restricted cell as input and outputs the output band restricted cell signal 119 as read out signal when the cell is present in the buffer, and outputs the read out signal 114 for remainder band restricted cell for enabling transmission of the buffer 22 for non-band restricted cell when the cell is not present.

The buffer 22 for non-band restricted cell takes the input non-band restricted cell signal 112 to write the cell in the buffer (not shown). On the other hand, the buffer 22 for non-band restricted cell takes the read out signal 121 for non-band restricted cell and the remainder band restricted cell read out signal 114 as inputs to output the output non-band restricted cell signal 120 as read out signal when the cell is present in the buffer, and to output the read out signal 117 for remainder non-band restricted cell when the cell is not present in the buffer.

At this time, when input new packet stop signal 113 commands stopping, the buffer 22 for non-band restricted cell is responsive to completion of reading of a cell containing "1" in EOC (End of Cell) bit in the asynchronous transfer mode (ATM) cell indicative of the end of the packet, even if the cell is present in the buffer, to stop transmission of cell until stop command by the packet stop signal 113 is released and output the read out signal 117 for the remainder non-band restricted cell.

The idle cell generating portion 26 takes the read out signal 117 for the remainder non-band restricted cell to generate the idle cell for inserting in a remainder band to output to the output idle cell signal 118. The transmission signal multiplexing portion 25 receives the output band restricted cell signal 119, the output non-band restricted cell signal 120 and the idle cell signal 118 as inputs to output the PDS up-link signal 102 by multiplexing the input signals.

It should be noted that the ONU processing portions 2-1 to 2-n shown in FIG. 1 have the same construction and operation as the ONU processing portion 2 set forth above. Therefore, discussion for the construction and operation of the ONU processing portions 2-1 to 2-n will not be given for avoiding redundant disclosure and whereby to keep the disclosure simple enough to facilitate clear understanding of the present invention.

Figure 3:
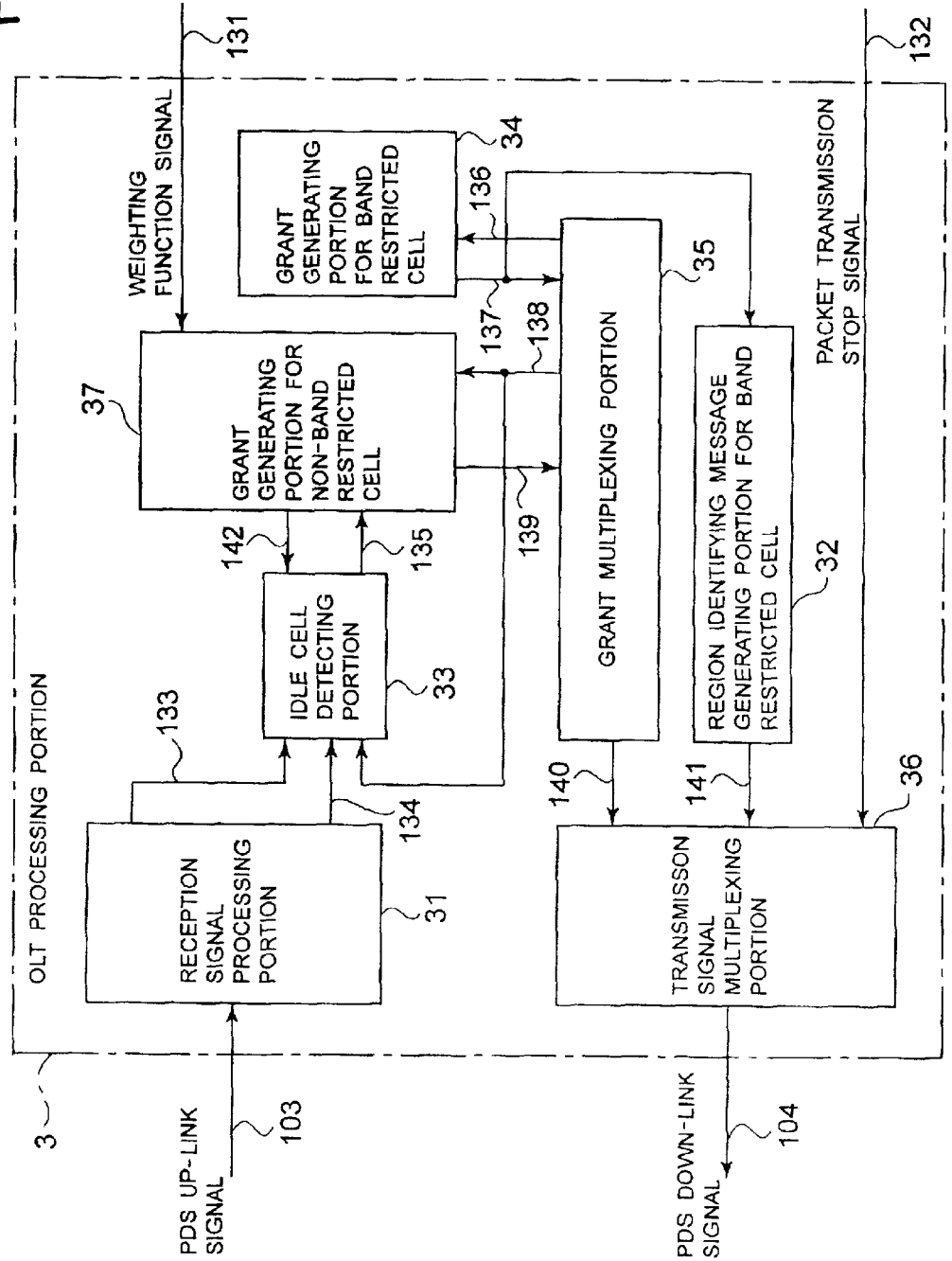
FIG. 3 is a block diagram showing a construction of an OLT processing portion of FIG. 1.

FIG. 3 is a block diagram showing a construction of the OTL processing portion 3 shown in FIG. 1. In FIG. 3, the OTL processing portion 3 is constructed with a reception signal processing portion 31, a region identification message generating portion 32 for the band restricted cell, an idle cell detecting portion 33, a grant generating portion 34 for band restricted cell, a grant multiplexing portion 35, a transmission signal multiplexing portion 36 and a grant generating portion 37 for non-band restricted cell.

The reception signal processing portion 31 takes the PDS up signal 103 as input and outputs an ONU identification number signal 133 and a cell signal 134 per each cell. The idle cell detecting portion 33 receives the ONU identification number signal 133, the cell signal 134, the grant read out signal 138 for non-band restricted cell and update signal 142 as inputs to monitor whether the idle cell is present or not per detecting position indicative of response position for the grant for non-band restricted cell and accumulates by counting up as non-idle cell number as not the idle cell. The accumulated non-idle cell number is output as idle cell number signal per every time of input of the update signal 142 and then cleared.

The grant generating portion 37 for non-band restricted cell receives the grant demand number signal 135 per ONU identification number, the weighting function signal 131 and the grant read out signal 138 for non-band restricted cell as inputs to perform scheduling of grant so that the idle cells per ONU number become uniform, and whereby to output the grant signal 139 for non-band restricted cell per every input of grant read out signal 138 for non-band restricted cell. On the other hand, the grant generating portion 37 for non-band restricted cell outputs the update signal 142 at every occurrence of scheduling of grant. The weighting function signal 131 performs correction to the number for next assignment with respect to decreasing number of the idle cells.

The grant signal generating portion 34 for band restricted cell receives the read out signal 136 for band restricted cell as input to output the grant signal 137 for band restricted cell for the grant when the grant for band restricted cell is assigned. On the other hand, the grant signal generating portion 34 for band restricted cell is responsive to input of the read out signal 136 for band restricted cell while no grant for the band restricted cell is present, to output an unassigned grant as the grant signal 137 for band restricted cell.

The grant multiplexing portion 35 outputs the read out signal 136 for band restricted cell at every occasion of reading out indicative of the grant feed position. At the same time, the grant multiplexing portion 35 receives the grant signal 137 for band restricted cell as input to output the grant signal 140 as the grant for the band restricted cell when the grant signal 137 for band restricted cell as input does not represents the unassigned grant. Also, the grant multiplexing portion 35 receives the grant signal 139 for non-band restricted cell as input to output the grant signal 140 as the grant for the non-band restricted cell.

The region identification message generating portion 32 for band restricted cell receives the grant signal 137 for band restricted cell as input to generate a message indicative of a region of the band restricted cell to output a grant region judgment message signal 141 for band restricted cell per every cyclic period of the band restricted cell grant. The transmission signal multiplexing portion 36 receives the grant signal 140, the grant region judgment message signal 141 for band restricted cell and new packet transmission stop signal 132 as inputs and outputs the PDS down signal 104.

Figure 4:
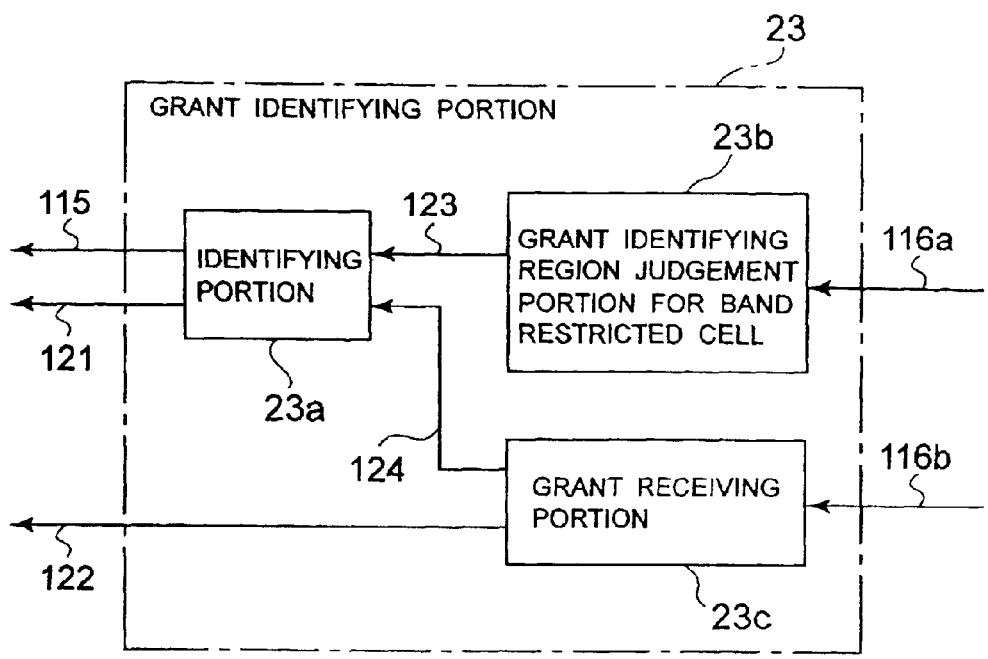
FIG. 4 is a block diagram showing a detailed construction of an example of a grant identifying portion of FIG. 2.

FIG. 4 is a block diagram showing the detailed construction of the grant identifying portion 23 in FIG. 2. In FIG. 4, the grant identifying portion 23 is constructed with a identifying portion 23a, grant identifying region judgment portion 23b for band restricted cell and grant receiving portion 23c.

The grant identifying portion 23 has a construction for using the grant region identifying message for the band restricted cell. At this time, the grant signal group 116 is consisted of a grant identifying region message signal 116a for band restricted cell and a grant signal 116b.

The grant identifying region judgment portion 23b for band restricted cell receives the grant identifying region message signal 116a for band restricted cell as input to make judgment of the grant region for the band restricted cell to output the identification signal 123 for band restricted cell. The grant region for the band restricted cell is maintained until the next grant identifying region message signal 116a for band restricted cell is input.

The grant receiving portion 23c receives the grant signal 116b as input to output the cell read out signal 124 when the grant signal 116b is the cell grant for own unit, and outputs short cell read out signal 122 when the grant signal 116b is the short cell grant for the own unit.

The identifying portion 23a receives the identification signal 123 for band restricted cell and the cell read out signal 124 as input to output the band restricted cell read out signal 115 in response to input of the cell read out signal 124 while in the band restricted cell region, and to output the non-band restricted cell read out signal 121 in response to input of the cell read out signal 124 while not in the band restricted cell region.

Figure 5:
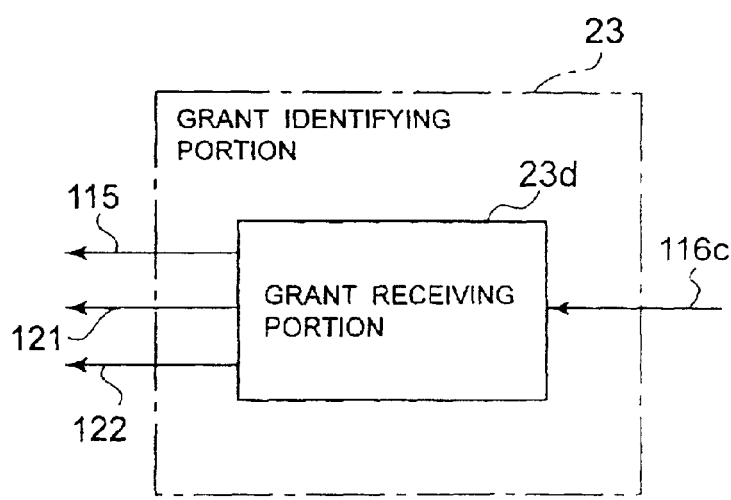
FIG. 5 is a block diagram showing a detailed construction of another example of a grant identifying portion of FIG. 2.

FIG. 5 is a block diagram showing another example of construction in detail of the grant identifying portion 23 of FIG. 2. In FIG. 5, the grant identifying portion 23 is constructed with a grant receiving portion 23d, which represents a construction in the case where one grant for the band restricted cell and one grant for the non-band restricted cell per one ONU identification number.

At this time, the grant signal group 116 is a grant signal 116c. The grant receiving portion 23d receives the grant signal 116c as input to output the band restricted cell read out signal 115 when the grant signal 116c represents the grant for the band restricted cell for own unit, to output the non-band restricted cell read out signal 121 when the grant signal 116c represents the grant for non-band restricted cell for non-band restricted cell for own unit and to output the short cell read out signal 122 when the grant signal 116c is the grant for band restricted short cell for own unit.

Figure 6:
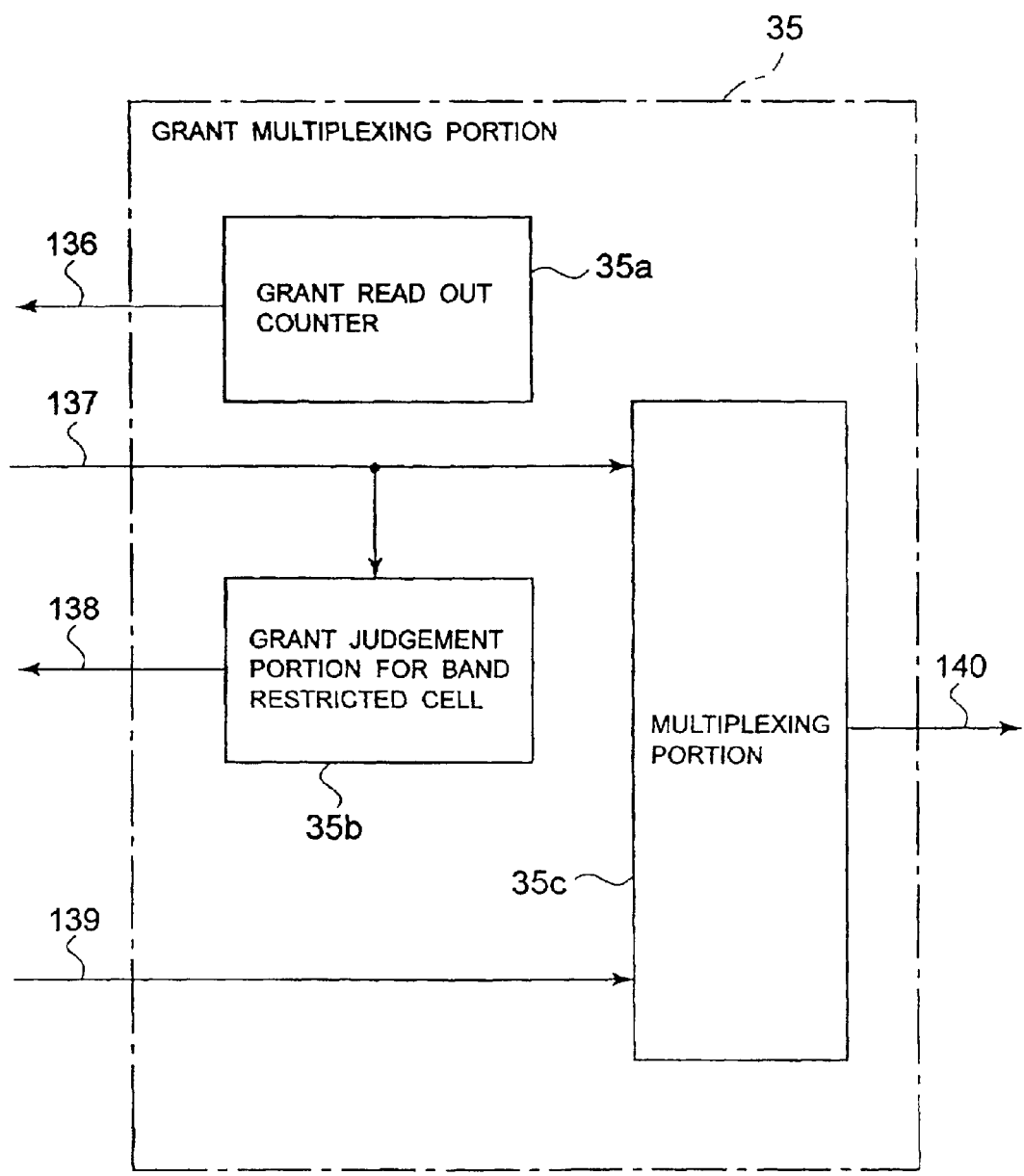
FIG. 6 is a block diagram showing a detailed construction of a grant multiplexing portion of FIG. 3.

FIG. 6 is a block diagram showing a detailed construction of the grant multiplexing portion 35 of FIG. 2. In FIG. 6, the grant multiplexing portion 35 is constructed with a grant read out counter 35a, a grant judgment portion 35b for band restricted cell and a multiplexing portion 35c.

The grant read out counter 35a outputs the read out signal 136 for band restricted cell every time of reading out indicative of the grant feeding position. The grant judgment portion 35b for band restricted cell receives the grant signal 137 for band restricted cell as inputs to output a grant read out signal 138 for non-band restricted cell when the grant signal 137 for band restricted cell represents the unassigned grant.

The multiplexing portion 35c receives the grant signal 137 for band restricted cell and grant signal 139 for non-band restricted cell as inputs to erase the unassigned cell and multiplex them to output the grant signal 140.

Figure 7:
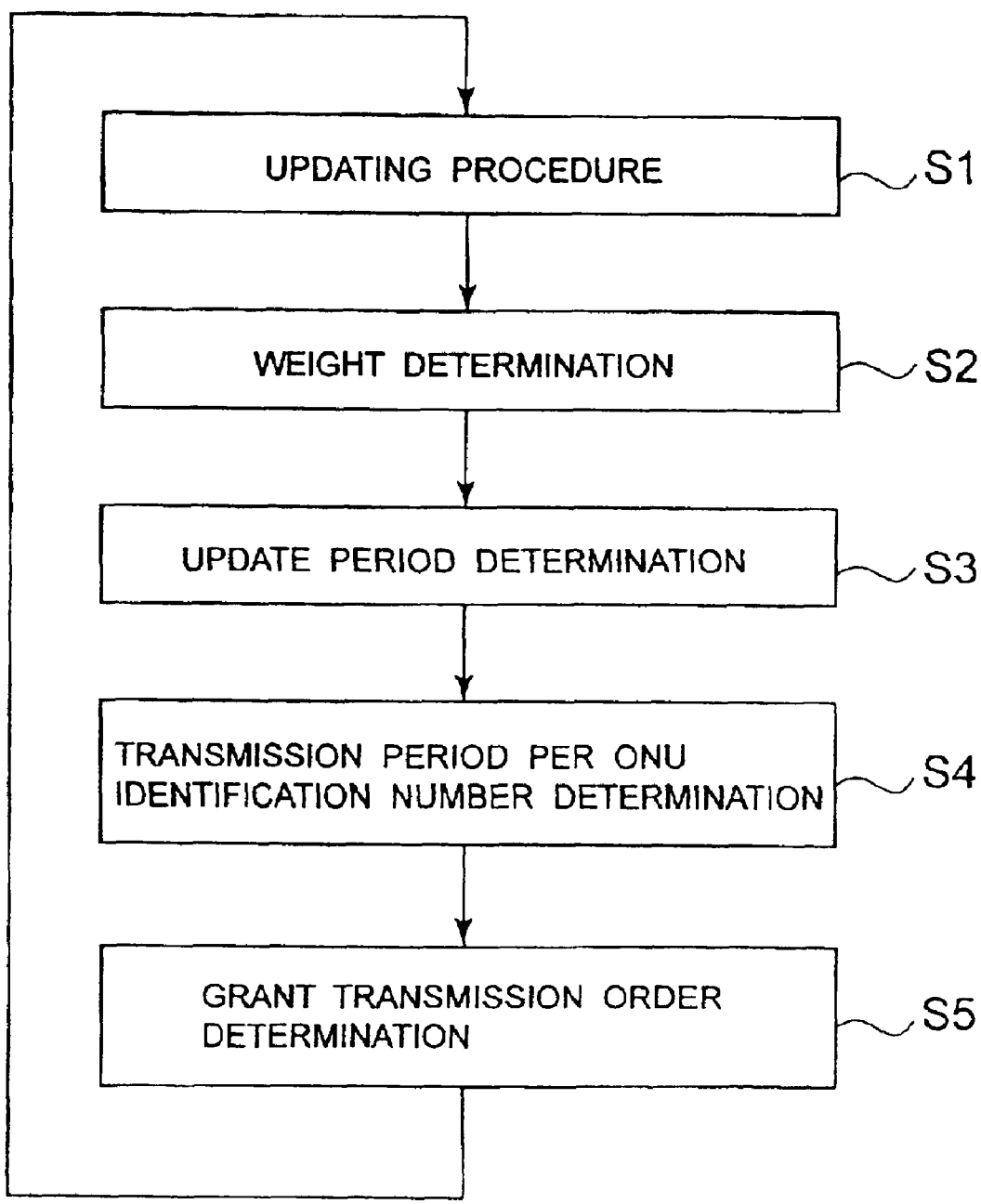
FIG. 7 is a flowchart showing a detailed process operation of a grant generating portion for non-band restricted cell of FIG. 3.
Figure 8:
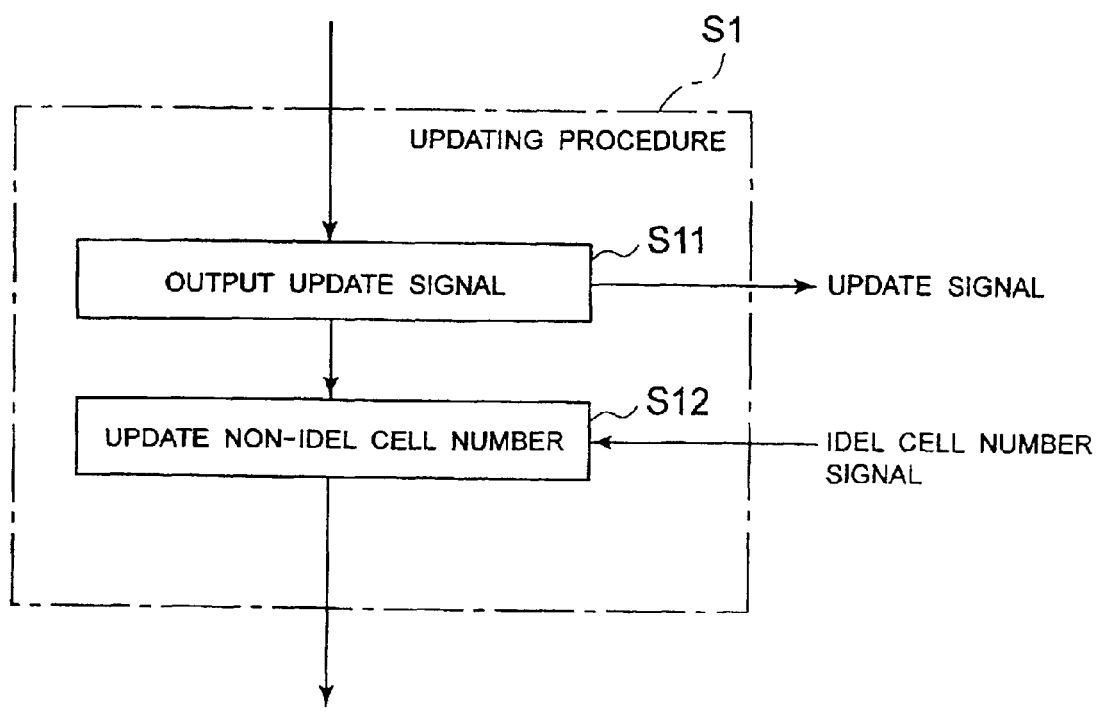
FIG. 8 is a flowchart showing a detailed process operation of updating procedure of FIG. 7.
Figure 9:
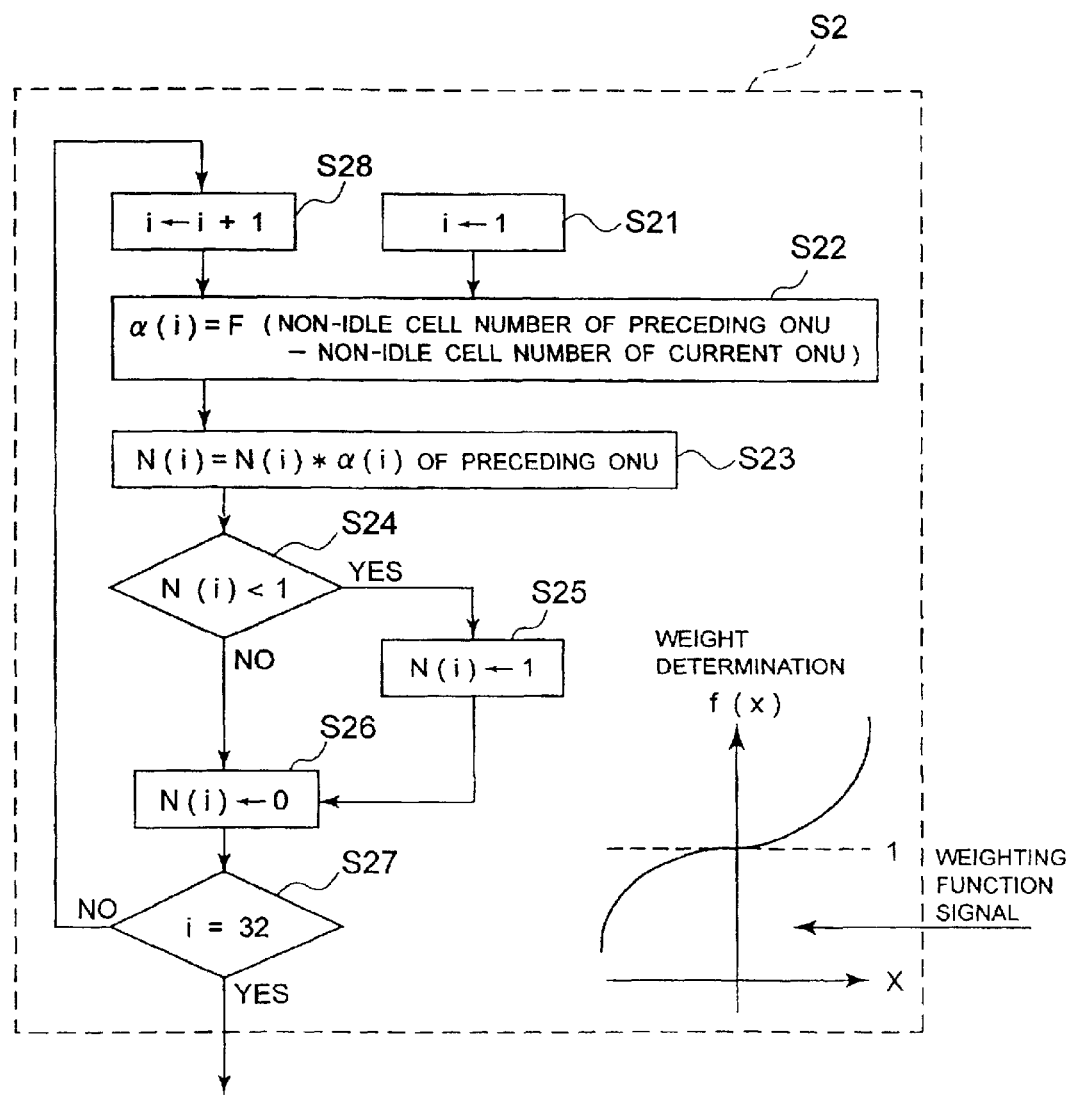
FIG. 9 is a flowchart showing a detailed process operation of a weighting determination process of FIG. 7.
Figure 10:
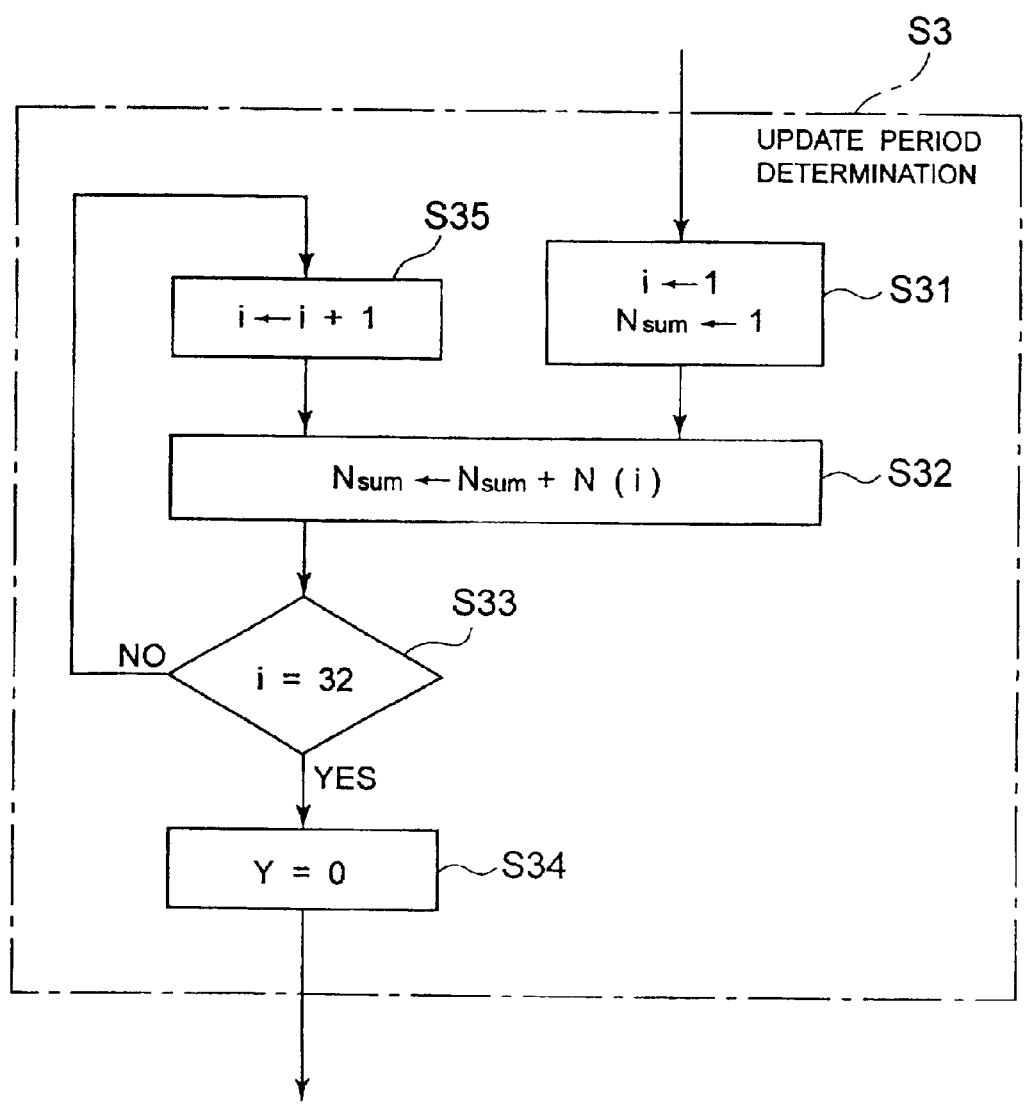
FIG. 10 is a flowchart showing a detailed process operation of an updating period determination process of FIG. 7.
Figure 11:
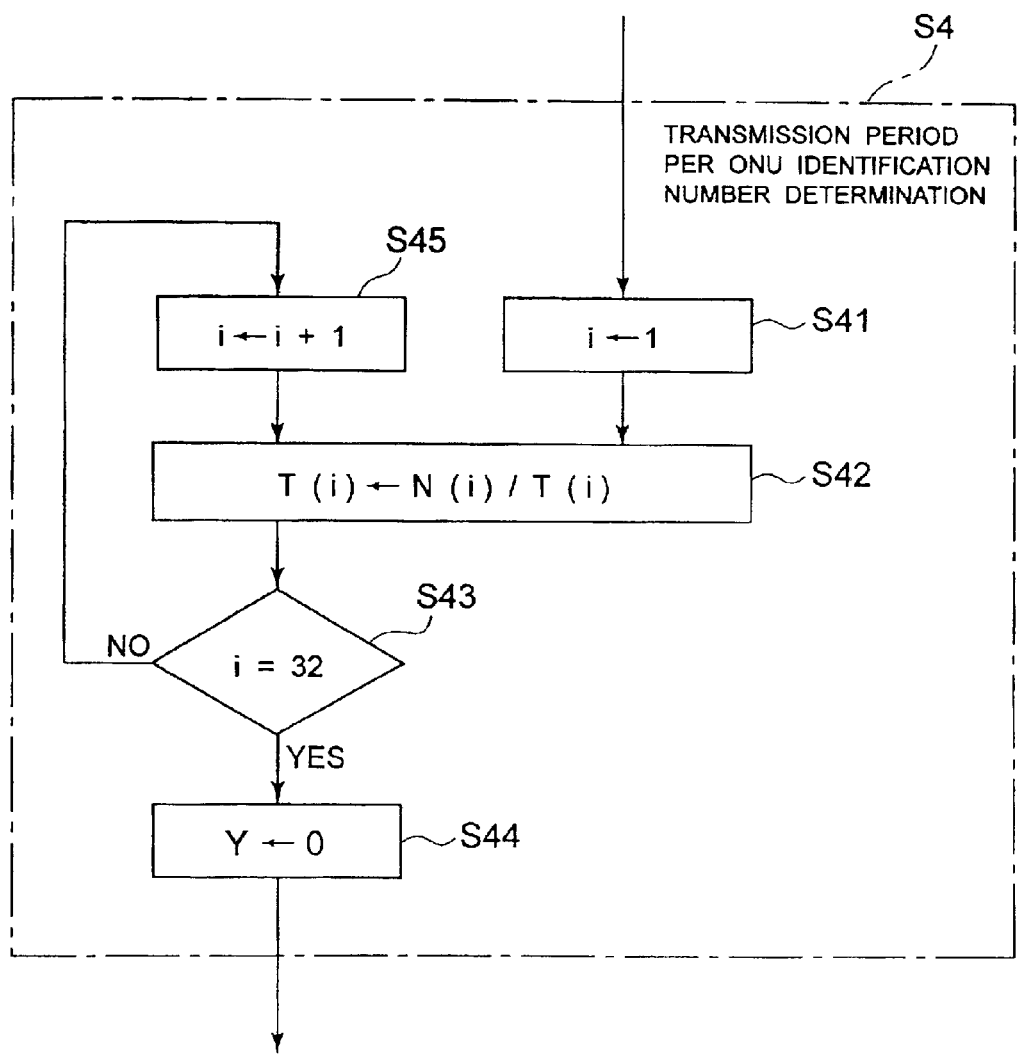
FIG. 11 is a flowchart showing a detailed process operation of a transmission period determination process of FIG. 7.
Figure 12:
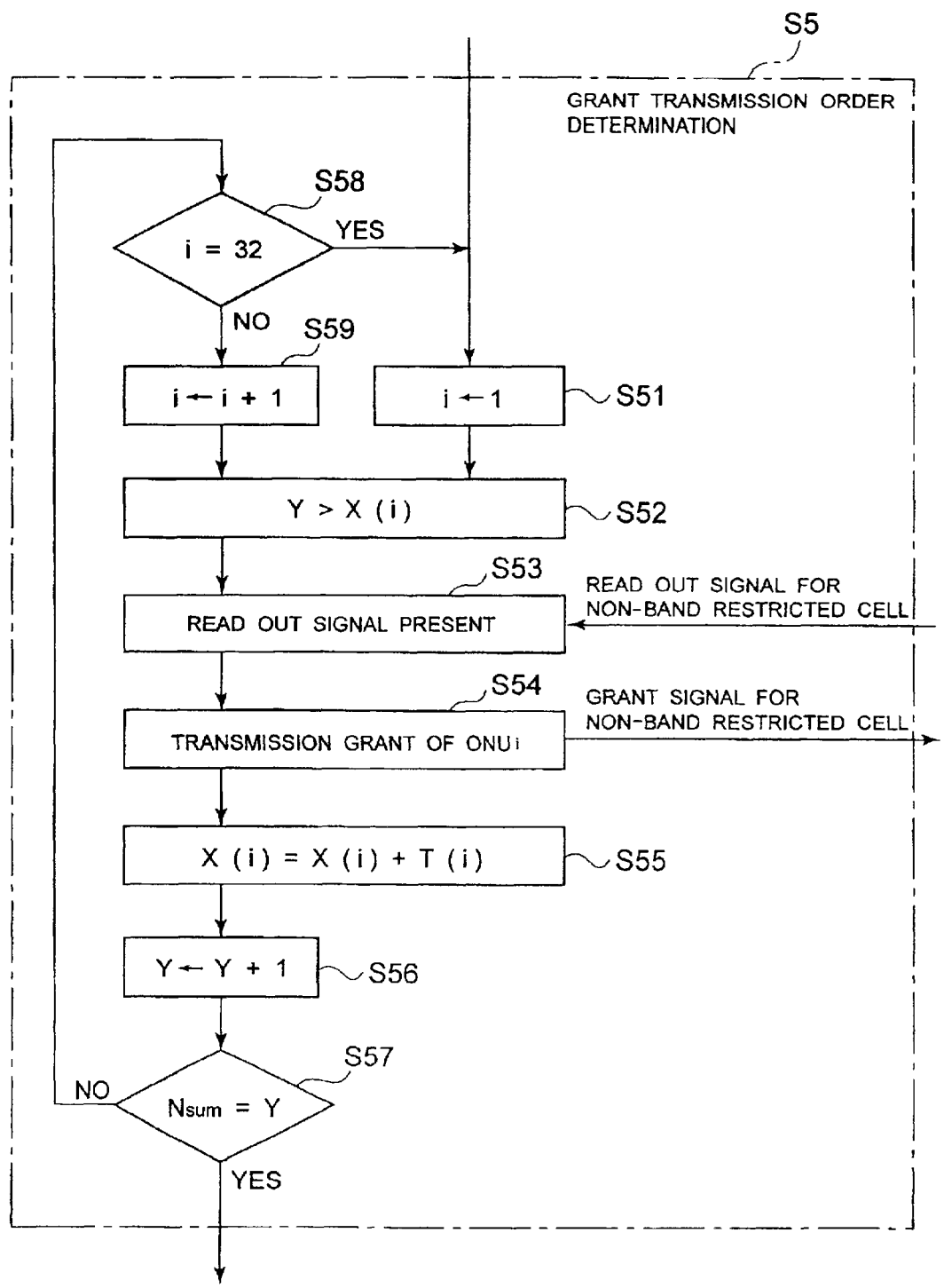
FIG. 12 is a flowchart showing a detailed process operation of a grant transmitting order determining process of FIG. 7.

FIG. 7 is a flowchart showing a detailed process operation of a grant generating portion 37 for non-band restricted cell of FIG. 3, FIG. 8 is a flowchart showing a detailed process operation of updating procedure of FIG. 7, FIG. 9 is a flowchart showing a detailed process operation of a weighting determination process of FIG. 7, FIG. 10 is a flowchart showing a detailed process operation of an updating period determination process of FIG. 7, FIG. 11 is a flowchart showing a detailed process operation of a transmission period determination process of FIG. 7, and FIG. 12 is a flowchart showing a detailed process operation of a grant transmitting order determining process of FIG. 7.

Figure 15:
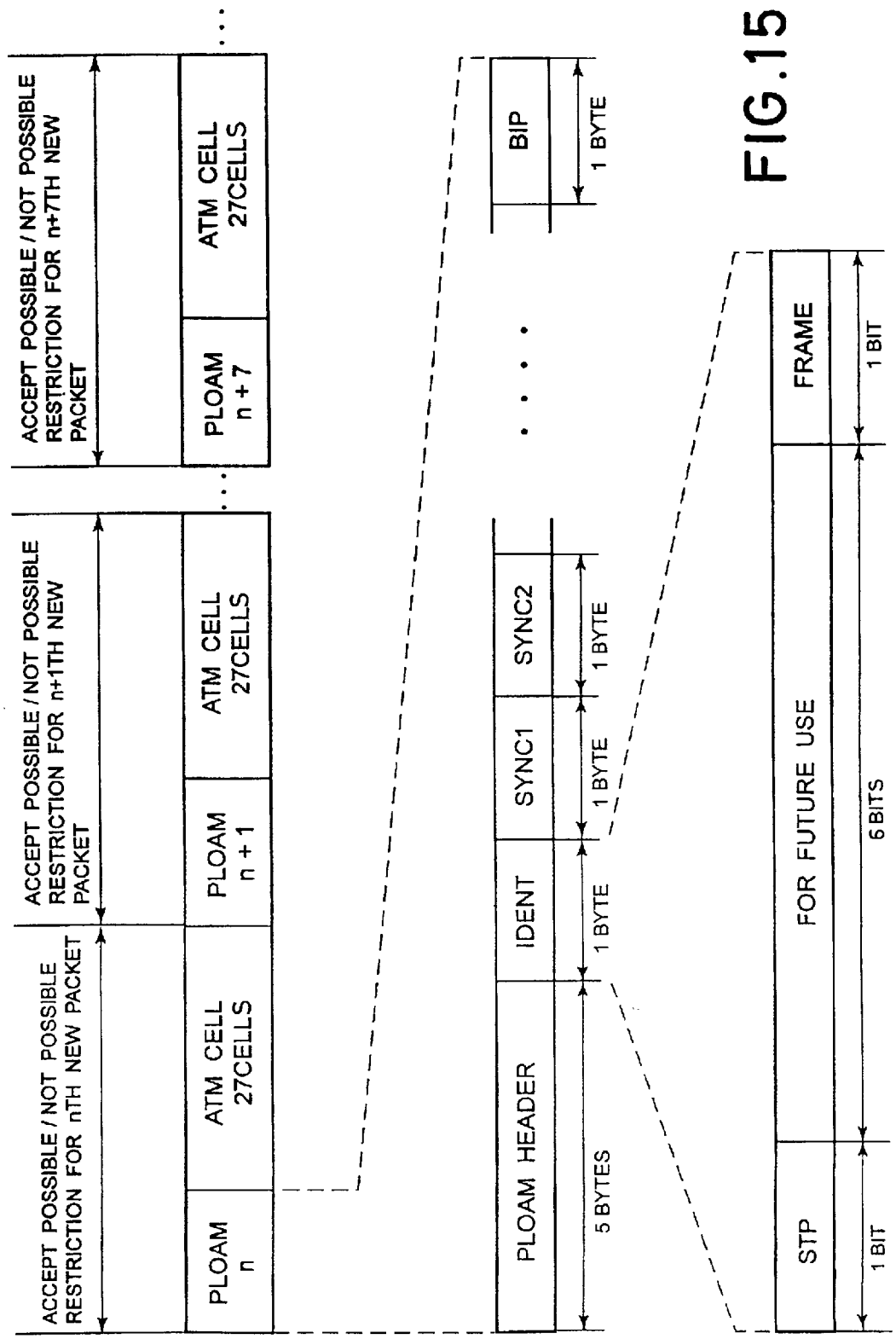
FIG. 15 is an illustration showing a new packet stop signal.

FIG. 13 is an illustration showing a relationship between a region identification message for non-band restricted cell and a timing chart in the grant identifying portion 23 of FIG. 4, FIG. 14 is an illustration showing a relationship between a region identification message for non-band restricted cell and a timing chart in the grant identifying portion 23 of FIG. 5, and FIG. 15 is an illustration showing a new packet stop signal. Process operation of the foregoing embodiment of the present invention will be discussed with reference to FIGS. 7 to 15.

In ATM communication, there are a service which requires band restriction to establish an agreement in communication quality between a subscriber and network manager, such as constant bit rate (CBR) or the like and a service which does not require band restriction, called as best effort, such as unspecified bit rate (UBR) and so forth.

In this case, it is required to vary band width keeping in mind the quality in agreement for the cell required band restriction. While the cell which does not require band restriction does not require the quality, it is required to vary the band at high speed for using the resource of the network in the most efficient way. Here, the PDS defined in ITU-T G. 983.1 requires to operate both of the cells requiring band restriction and the cells not requiring the band restriction having mutually distinct tasks to satisfy the demand.

In the foregoing embodiment of the present invention, at first, as a function for varying the band in consideration of the quality of the cells which does require band restriction, means for performing each individual process for the cells requiring band restriction and cells which do not require to consider the communication quality is provided. For this, a method to use the region identifying message for the band restricted cell and a method for individually assigning the grant will be illustrated.

The method using the region identifying message for the band restricted cell is a method for defining the message shown in FIG. 13. The OLT processing portion 3 performs update every time of establishing agreement between the subscriber and the network manager. At this time, the message indicative of the region of the grant for the band restricted cell is generated and transmitted by the region identification message generating portion 32 for band restricted cell.

The ONU processing portion 2 uses the region message for the band restricted cell and the grant signal in the grant identifying portion 23 to perform individual process by identifying the grant for the band restricted cell and the grant for the non-band restricted cell. Namely, the OLT processing portion 3 can freely perform variation of the band for the region other than the cell requiring band restriction.

The method for individually assigning the grant is the method for defining the message shown in FIG. 14. In this case, similarly to the above, the OLT processing portion 3 can freely perform variation of the band for the region other than the cell requiring band restriction.

Secondly, the foregoing embodiment of the present invention has a function for identifying whether the cell arrives the ONU or not in order to effectively use the up-link band of the PDS for the cell not requiring band restriction. For this purpose, extra band is constantly assigned for each ONU and the grant generating portion 37 for non-band restricted cell and an idle cell detecting portion 33 are provided for monitoring increasing and decreasing of the idle cells.

When no cell to transmit is present in the ONU processing portion 2, the idle cell is transmitted from the idle cell generating portion 26. For the grant excessively assigned, the OLT processing portion 3 may instantly recognize arrival of cell when number of idle cell becomes small.

Processing operation will be discussed in detail with reference to the process flow of the grant generating portion 37 for non-band restricted cell shown in FIGS. 7 to 12. The process flow is consisted of updating procedure (step S1 of FIG. 7 and steps S11, S12 of FIG. 8), weight determination (steps S2 of FIG. 7 and steps S21 to S28 of FIG. 9), updating period determination (step S3 of FIG. 7 and steps S31 to S35 of FIG. 10), the transmission period determination per ONU identification number (step S4 of FIG. 7, steps S41 to S45 of FIG. 11) and grant transmitting order determination (step S5 of FIG. 7, steps S51 to S59 of FIG. 12).

The updating procedure reads out number of idle cells input from the non-idle cell detecting portion 33 during updating period per ONU identification number. Weight determination determines number of assigned grant according to a preliminarily input weighting function for variation amount of non-idle cells of preceding identification number of the non-idle cells of the current identification number per ONU identification number. At this time, process is performed to assign so that at least one or more cells are assigned per the ONU identification number.

Regarding to determination of the updating period, updating period of the grant for the non-band restricted cell is determined according to the grant per ONU identification number. Regarding to determination of the transmission period per ONU identification number, respetive transmission period is determined accoding to an individual transmission period from number of grant per ONU identification number relative of the updating period. The grant transmission order determination is performed by transmitting the grant signal 139 for non-band restricted cell for the grant read out signal 138 for non-band restricted cell.

Overall process is stopped the operation in response to the grant read out signal 138 for non-band restricted cell. For one grant read out signal 138 for non-band restricted cell, one grant is fed as the grant signal 139 for non-band restricted cell. Then, next grant is determined to wait for inputting of the grant read out signal 138 for non-band restricted cell.

Thirdly, in the foregoing embodiment of the present invention, as a function for excluding unnecessary process, the packet which cannot be processed is not accepted. Namely, stopping of transmission of the IP packet information or the like is notified to the subscriber unit 10-1 to 10-n.

In the unit having a packet processing, to which the OLT processing portion 3 is connected, if new packet process is not possible, the new packet stop signal 113 is transmitted. Then, the new packet stop signal 113 is input to the ONU processing portion 2 as a signal STP (1=stop, 0=normal) as shown in FIG. 15. In the buffer 22 for non-band restricted cell of the ONU processing portion 2, the EOC signal in the ATM cell header is constantly monitored. In response to input of new packet stop signal 113 (STP=1), even when new packet is present in the buffer 22 for non-band restricted cell, if the ATM cell header having 1 in EOC is read out, reading out is stopped to wait for releasing (STP=0) of the packet stop signal.

Figure 16:
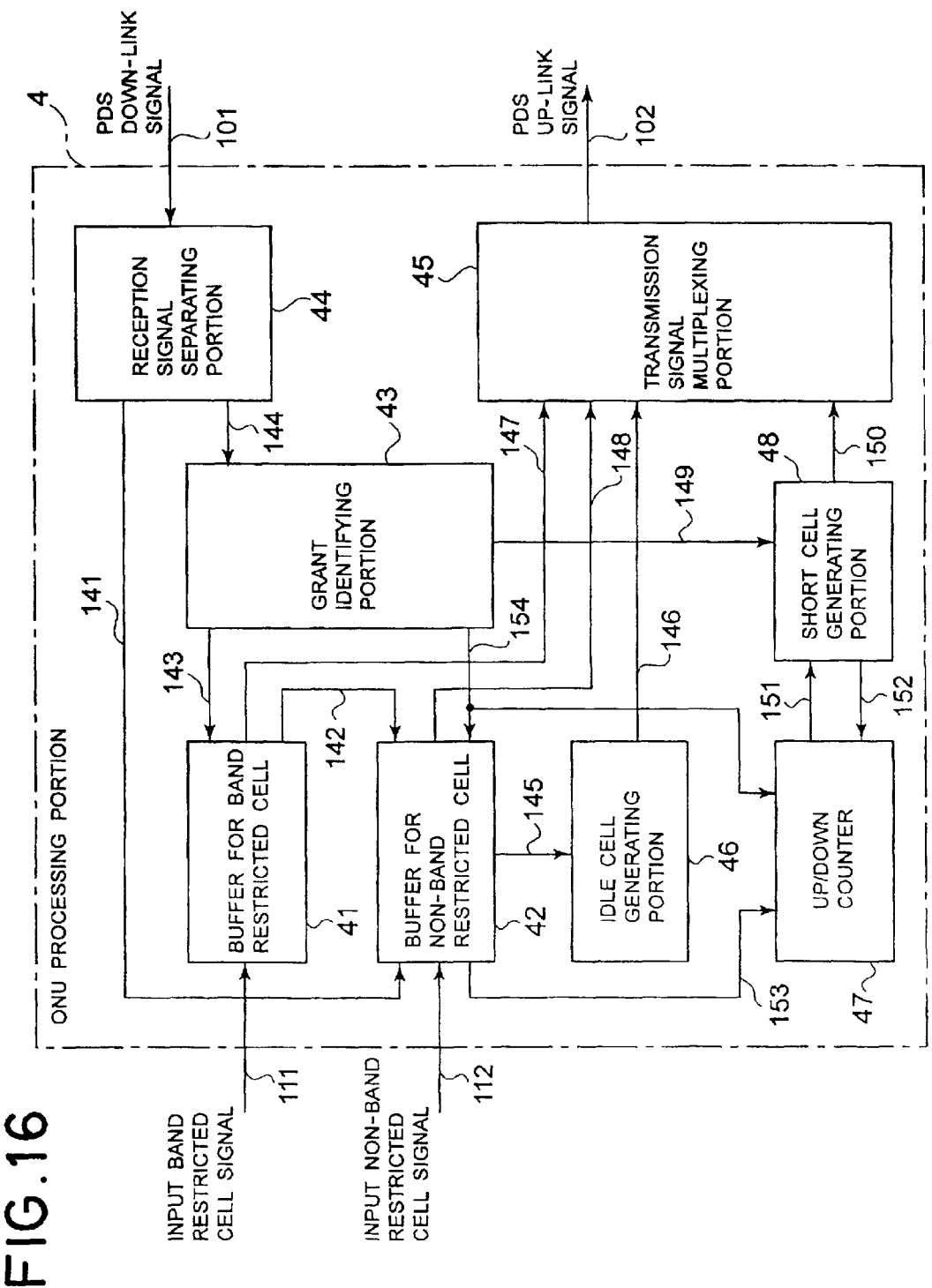
FIG. 16 is a block diagram showing a construction of an ONU processing portion in another embodiment of the present invention.

FIG. 16 is a block diagram showing a construction of another embodiment of the ONU processing portion according to the present invention. In FIG. 16, the ONU processing portion 4 is constructed with a buffer 42 for band restricted cell, a buffer 41 for non-band restricted cell, a grant identifying portion 43, a reception signal separating portion 44, a transmission signal multiplexing portion 45, an idle cell generating portion 46, an up/down counter 47 and a short cell generating portion 48.

The reception signal separating portion 44 receives the PDS down signal as input to output grant region judgment message signal 141 for band restricted cell by separating information indicative of enabling or disabling of transmission of new packet in IDENT byte periodically arranged in the PDS down-link frame, and outputs grant signal group 144 separating the grant information and the region identification message for the band restricting cell.

The grant identifying portion 43 receives the grant signal group 144 as input to output the read out signal 143 for band restricted cell when the grant for the band restricted cell is identified based on the grant information and the region identification message for the band restricted cell, outputs a read out signal 154 for non-band restricted cell when grant for the non-band restricted cell is identified, and outputs a short cell read out signal 149 when grant for the short cell is identified.

The buffer 41 for band restricted cell receives the input band restricted cell signal 111 to write the cell in the buffer (not shown), receives the read out signal 143 for band restricted cell as input to output an output band restricted cell signal 147 when cell is not present in the buffer and to output a read out signal 142 for remainder band restricted cell.

The buffer 42 for non-band restricted cell receives the input non-band restricted cell signal 112 as input to write the cell in the buffer (not shown) and output the write signal 153 for non-band restricted cell, and receives the read out signal 154 for non-band restricted cell and the read out signal 142 for remainder band restricted cell as input to output the input non-band restricted cell signal 148 as read out signal when the cell is present in the buffer, and to output the read out signal 145 for remainder cell.

At this time, when the input new packet stop signal 141 designates stop, even when the cell is present in the buffer, the buffer 42 for non-band restricted cell stops transmission of the cell until stop command of the packet stop signal 141 is released when reading of the cell which has "1" in EOC bit in the ATM cell indicative of end of the packet, is finished, and outputs the read out signal 145 for remainder cell.

The idle cell generating portion 46 receives the read out signal 145 for remainder cell as input to generate the idle cell for outputting the output idle cell signal 146. The up/down counter 47 counts up in response to input of the write signal 153 for non-band restricted cell, counts down in response to input of the read out signal 154 for non-band restricted cell, and outputs value of the counter representative of number of cells written in the buffer 42 for non-band restricted cell between short cells as grant demand number signal 151 and then resets the counter value.

The short cell generating portion 48 receives the short cell read out signal 149 and the signal demand number signal 151 as input and generates a short cell at the read timing of the short cell read out signal 149 to output the output short cell signal 50 and then to output reset signal 152.

The transmission signal multiplexing portion 45 receives the output band restricted cell signal 147, the output non-band restricted cell signal 148, the output idle cell signal 146 and the output short cell signal 150 as inputs to multiplex them to output the PDS up-link signal 102.

Figure 17:
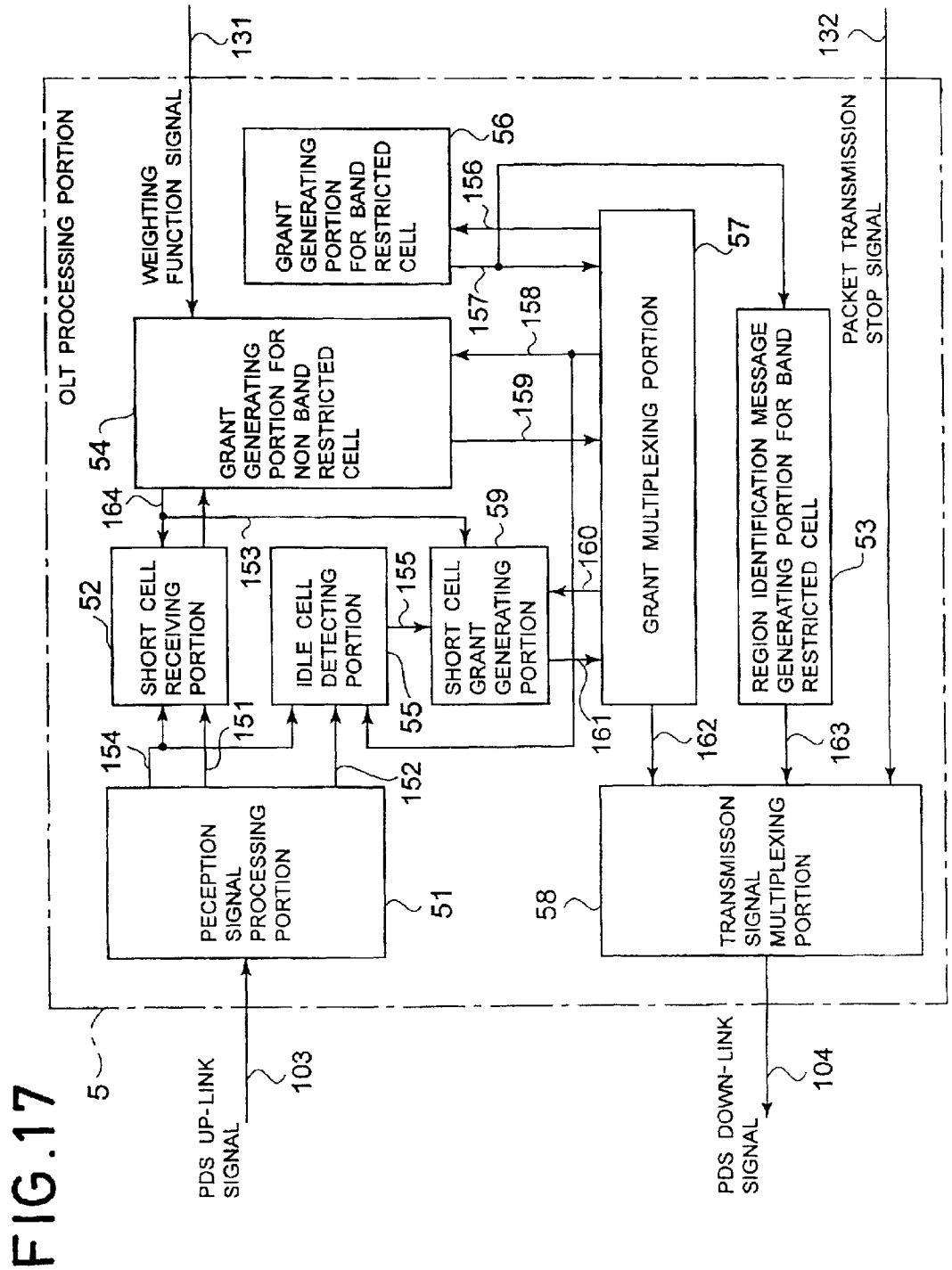
FIG. 17 is a block diagram showing a construction of an OLT processing portion in another embodiment of the present invention.

FIG. 17 is a block diagram showing a construction of another embodiment of the OLT processing portion according to the present invention. In FIG. 17, the OLT processing portion is constructed with a reception signal processing portion 51, a short cell receiving portion 52, a region identification message generating portion 53 for band restriction cell, a grant generating portion 54 for non-band restricted cell, a idle cell detecting portion 55, a grant generating portion 56 for band restricted cell, a grant multiplexing portion 57, a transmission signal multiplexing portion 58 and a short cell grant generating portion 59.

The reception signal processing portion 51 receives a PDS up signal 103 and outputs ONU identification number signal 154, short cell signal 151 and a cell signal 152 per cell. The short cell receiving portion 52 receives the ONU identification number signal 154, the short cell signal 151 and the update signal 164 as inputs, accumulates grant demand number separating the grant demand number from the short cell to output the signal 153 at every input of the update signal 164.

The idle cell detecting portion 55 receives the ONU identification number signal 154, the cell signal 152 and the grant read out signal 158 for non-band restricted cell as inputs to monitor whether the idle cell is present or not per detecting position indicative of response position for the grant for the non-band restricted cell, to output a no idle cell signal 155 when the idle cell is not present.

The short cell grant generating portion 59 receives the no idle cell signal 155, the short cell grant read out signal 160 and the update signal 164 to start generation of the short cell grant from a timing where no idle cell is left to generate the short cell at every input of the update signal 164.

Furthermore, the short cell grant generating portion 59 outputs a short cell grant signal 161 as corresponding short cell grant at a timing of the short cell grant read out signal 160. Furthermore, the short cell grant generating portion 59 is responsive to the short cell read out signal 160 while short cell grant is not present, to output an unassigned grant as the short cell grant signal 161.

The grant generating portion 54 for non-band restricted cell receives the grant demand number signal 153 per each ONU identification number, the weighting function signal 131 and the grant read out signal 158 for non-band restricted cell as inputs to perform scheduling of grant so that idle cells per ONU number become uniform to output the grant signal 159 for non-band restricted cell. The update signal 164 is output per one grant schedule. The weighting function signal 131 performs correction to the number for next assignment for variation of decreasing number of the grant demand number signal 153.

The grant generating portion 56 for band restricted cell receives the grant read out signal 156 for band restricted cell as input to output a grant signal 157 for band restricted cell. On the other hand, the grant generating portion 56 for band restricted cell outputs the grant signal 157 for band restricted cell of unassigned grant when the grant read out signal for band restricted cell is input while the grant for band restriction cell is not present.

The grant multiplexing portion 57 outputs the grant read out signal for band restricted cell per reading out indicative of grant transmission position. At the same time, grant multiplexing portion 57 receives the grant signal 157 for band restricted cell as input to output the grant signal 162 as grant for band restricted cell when the grant is not the unassigned grant, and to output the short cell grant read out signal 160 when the grant is unassigned grant.

The grant multiplexing portion 57 receives a short cell grant signal 161 to output a grant signal 162 as short cell grant when the grant is not unassigned grant, and to output a grant read out signal 158 for non-band restricted cell when the grant is unassigned grant. Furthermore, the grant multiplexing portion 57 receives the grant signal 159 for non-band restricted cell and outputs the grant signal 162 as the grant for non-band restricted cell.

The region identification message generating portion 53 for band restriction cell receives the grant signal 157 for band restricted cell as input to generate a message indicative of a region of the band restricted cell and outputs the grant region judgment message signal 163 for band restricted cell at every updating of the band restricted cell grant. The transmission signal multiplexing portion 58 receives the grant signal 162 for band restricted cell, the grant region judgment message signal 163 for band restricted cell and the new packet transmission stop signal 132 as inputs to output the PDS down signal 104.

Figure 18:
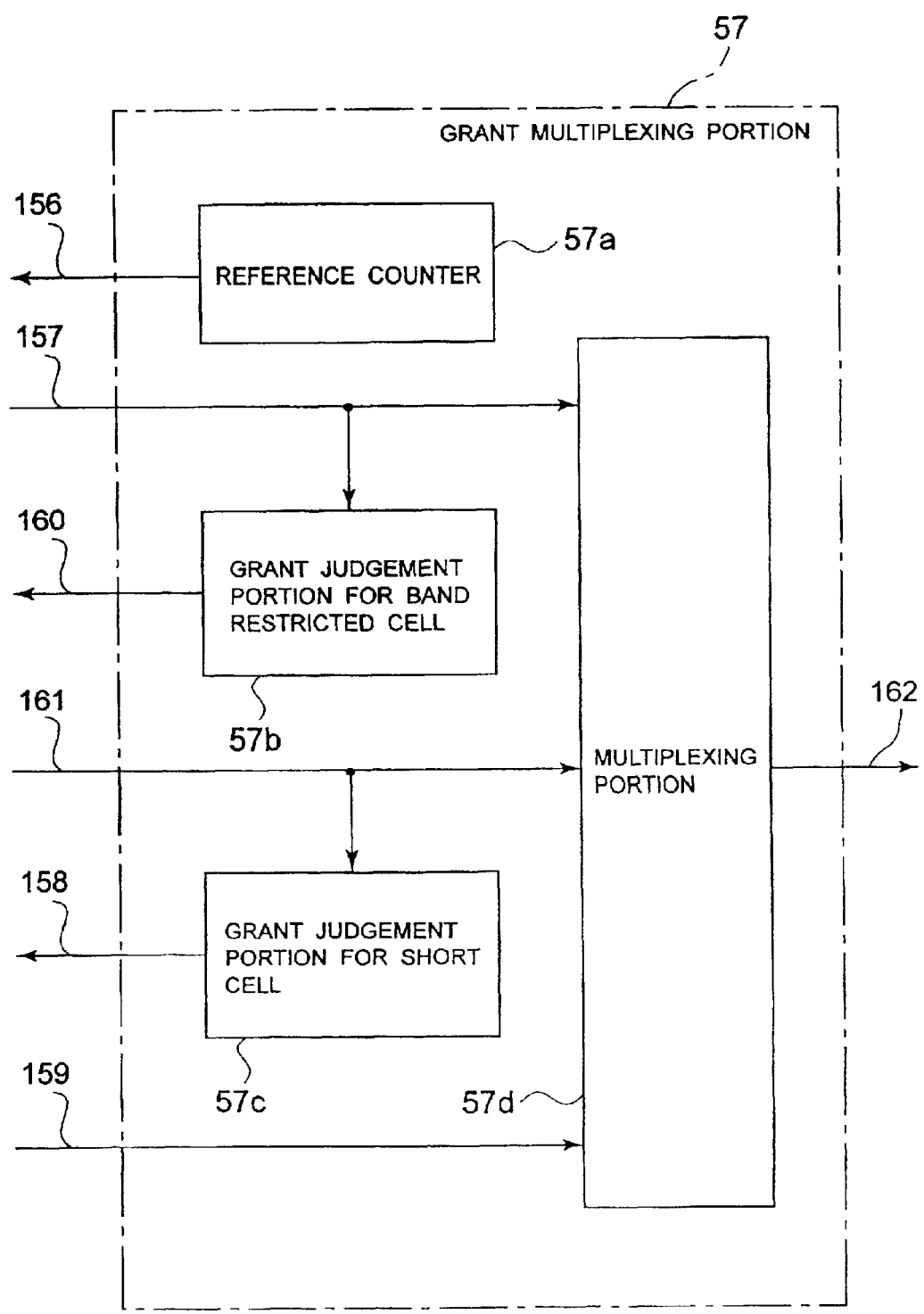
FIG. 18 is a block diagram showing a detailed construction of a grant multiplexing portion of FIG. 17.

FIG. 18 is a block diagram showing a detailed construction of the grant multiplexing portion 57 of FIG. 17. In FIG. 18, the grant multiplexing portion 57 is constructed with a reference counter 57a, a grant judgment portion 57b for band restricted cell, a grant judgment portion 57c for short cell and a multiplexing portion 57d.

The reference counter 57a outputs the grant read out signal 156 for band restricted cell per reading out indicative of the grant transmitting position. The grant judgment portion 57b for band restricted cell receives the grant signal 157 for band restricted cell as input and outputs the short cell grant read out signal 160 when the grant is unassigned grant cell. The grant judgment portion 57c for short cell receives the short cell grant signal 161 to output the grant read out signal 158 for non-band restricted cell when the grant is unassigned grant.

The multiplexing portion 57d receives the grant signal 157 for band restricted cell, the short cell grant signal 161 and the grant signal 159 for non-band restricted cell as inputs to erase the unassigned cell and then to output the grant signal 157 for band restricted cell by multiplexing them.

Figure 19:
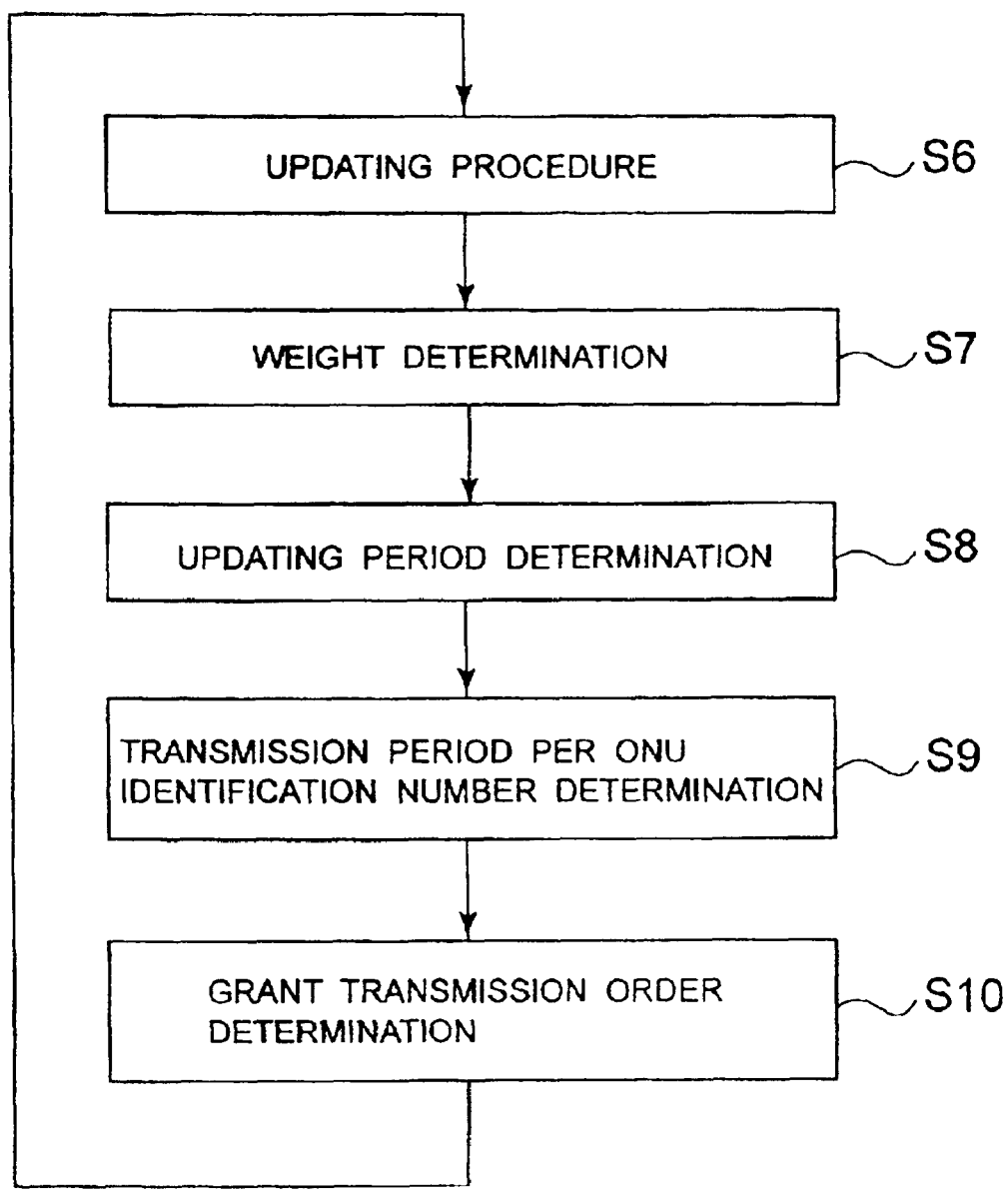
FIG. 19 is a flowchart showing a detailed process operation of a grant generating portion for non-band restricted cell of FIG. 17.
Figure 20:
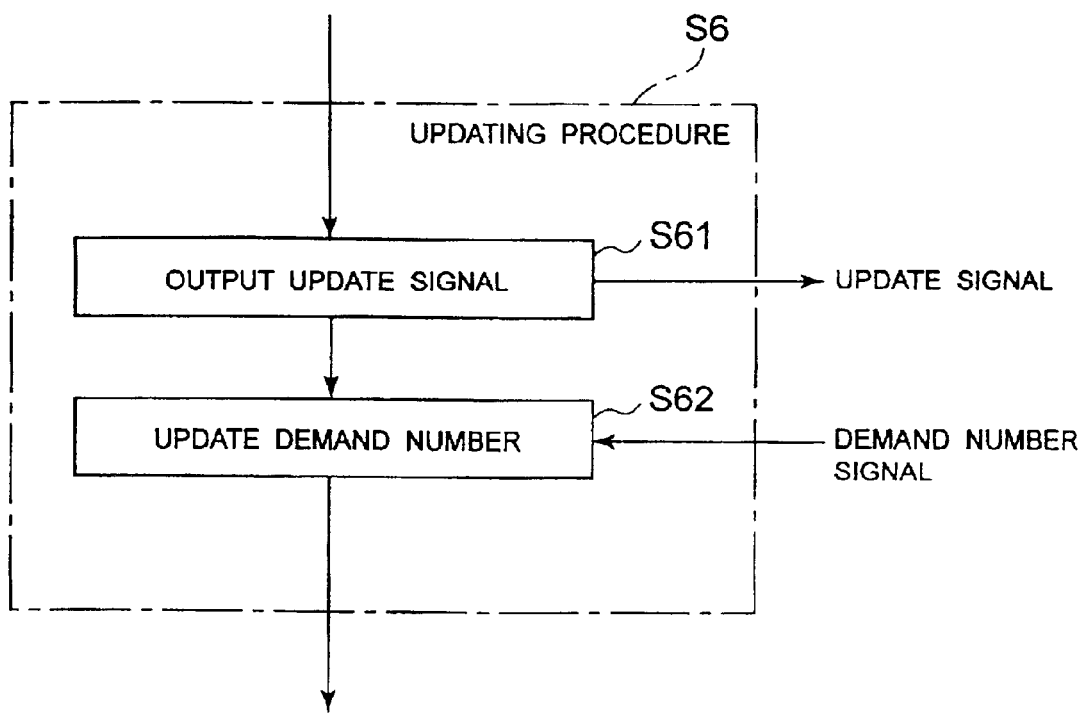
FIG. 20 is a flowchart showing a detailed process operation of updating procedure of FIG. 19.
Figure 21:
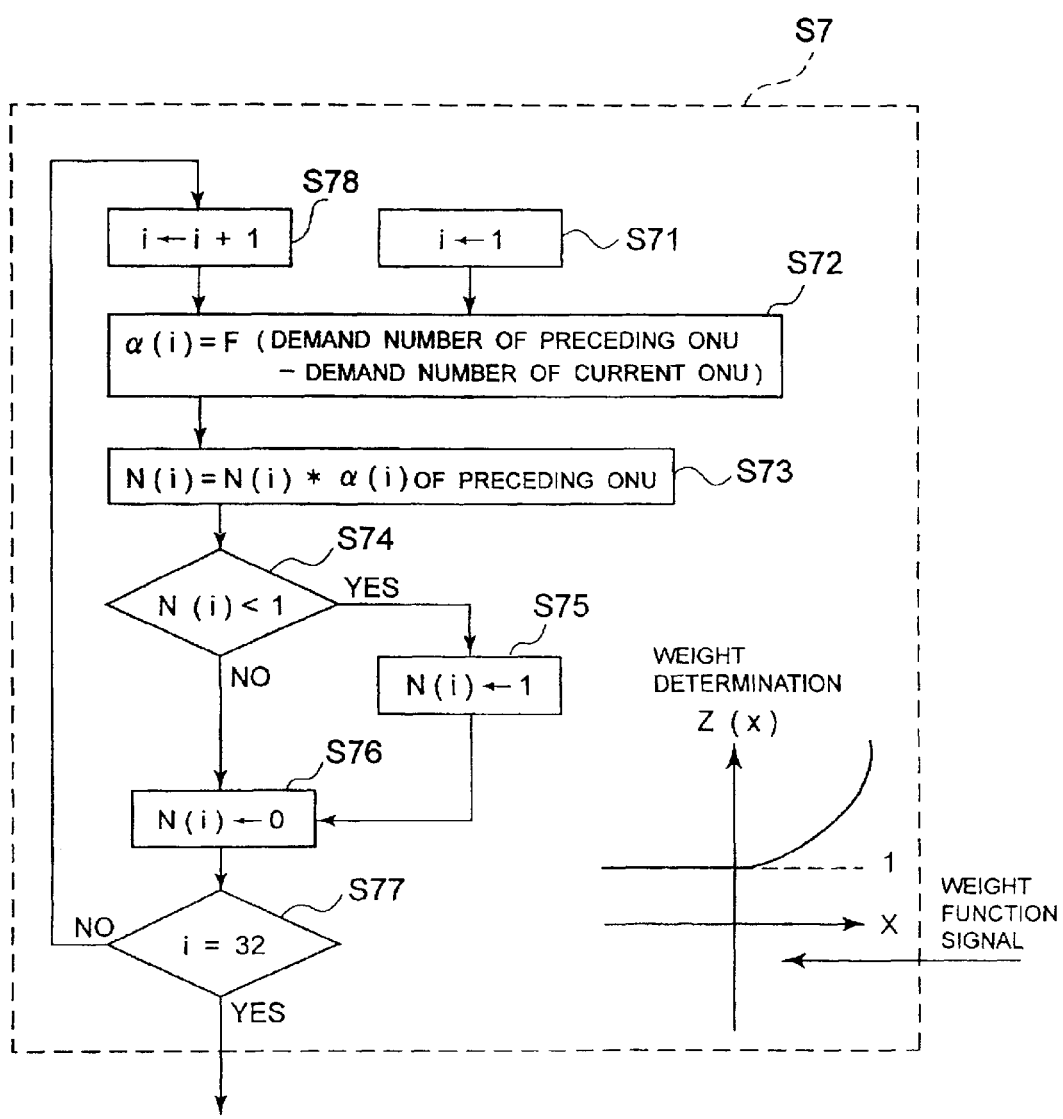
FIG. 21 is a flowchart showing a detailed process operation of a weighting determination process of FIG. 19.
Figure 22:
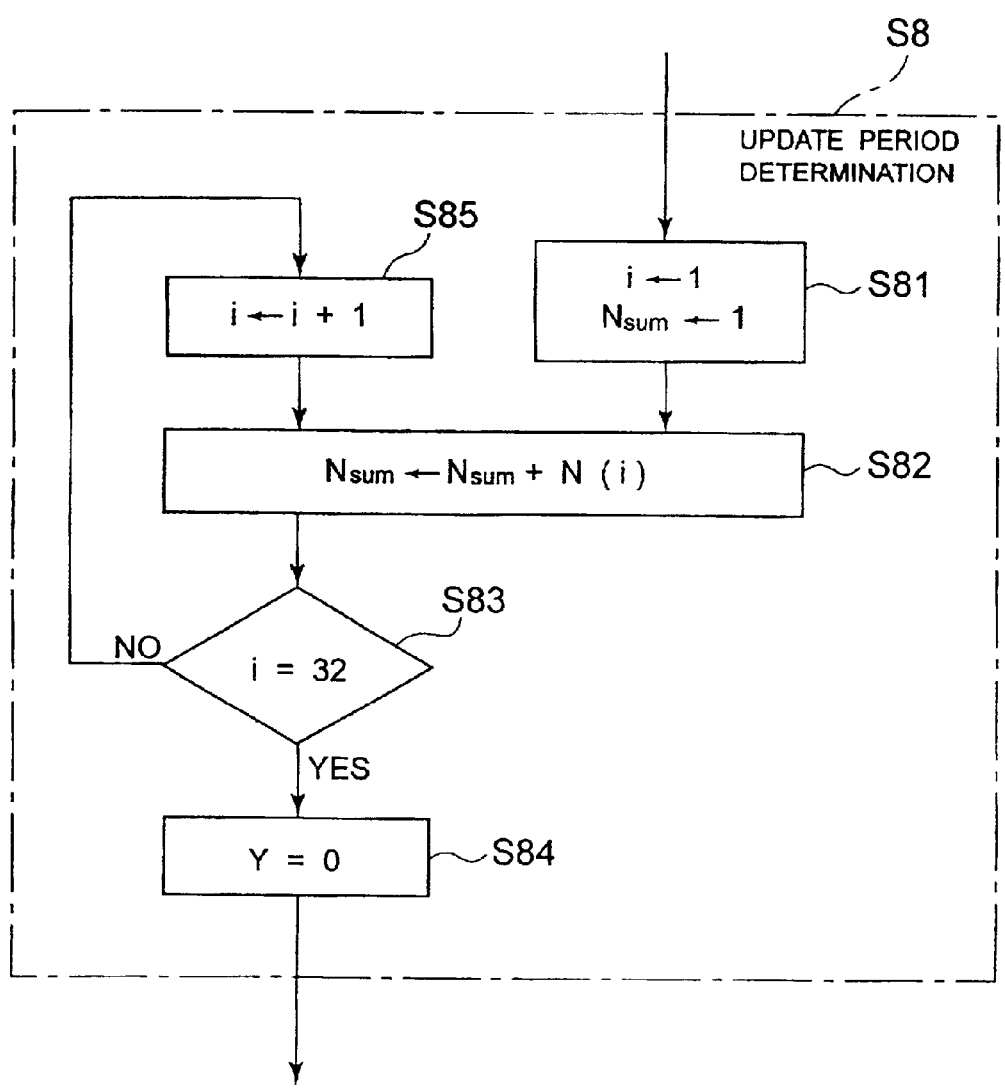
FIG. 22 is a flowchart showing a detailed process operation of an updating period determination process of FIG. 19.
Figure 23:
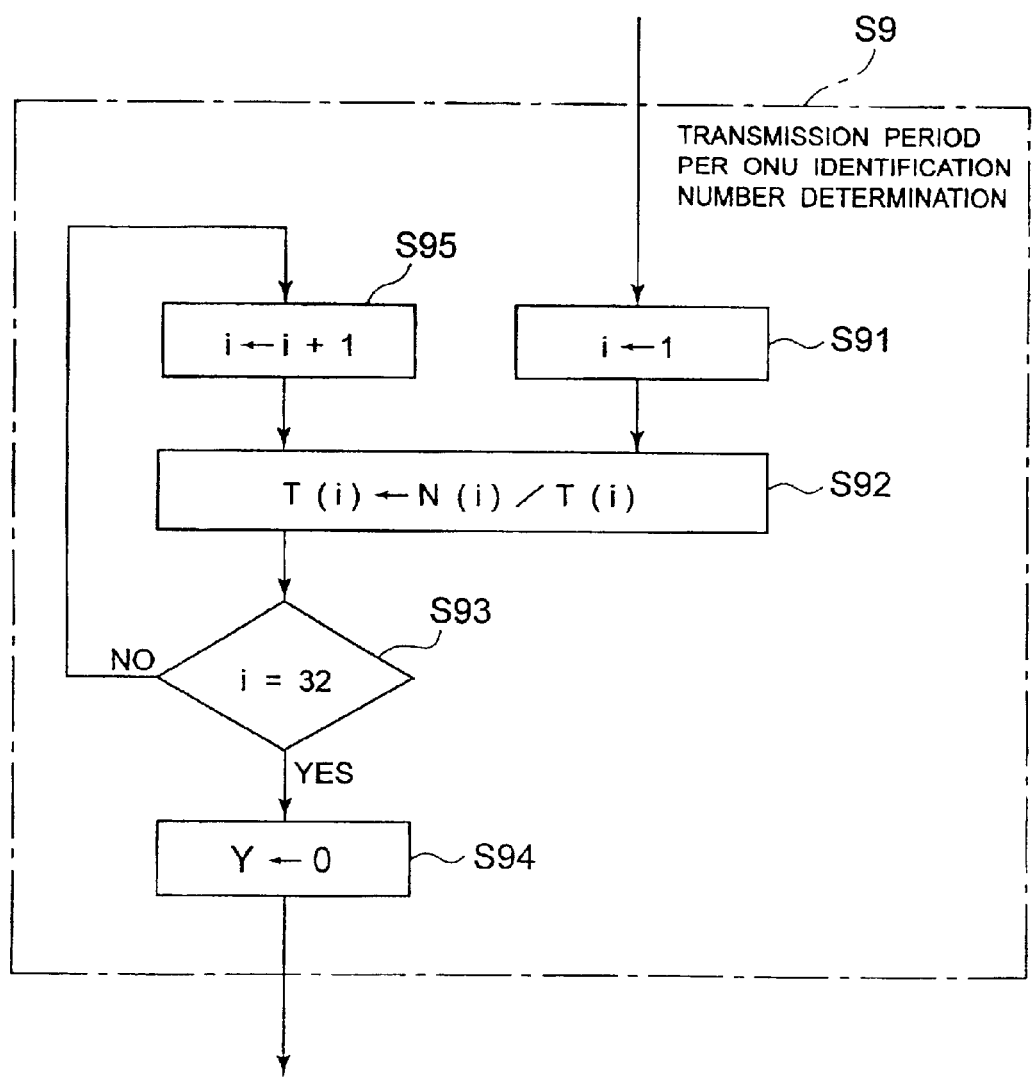
FIG. 23 is a flowchart showing a detailed process operation of a transmission period determination process of FIG. 19.
Figure 24:
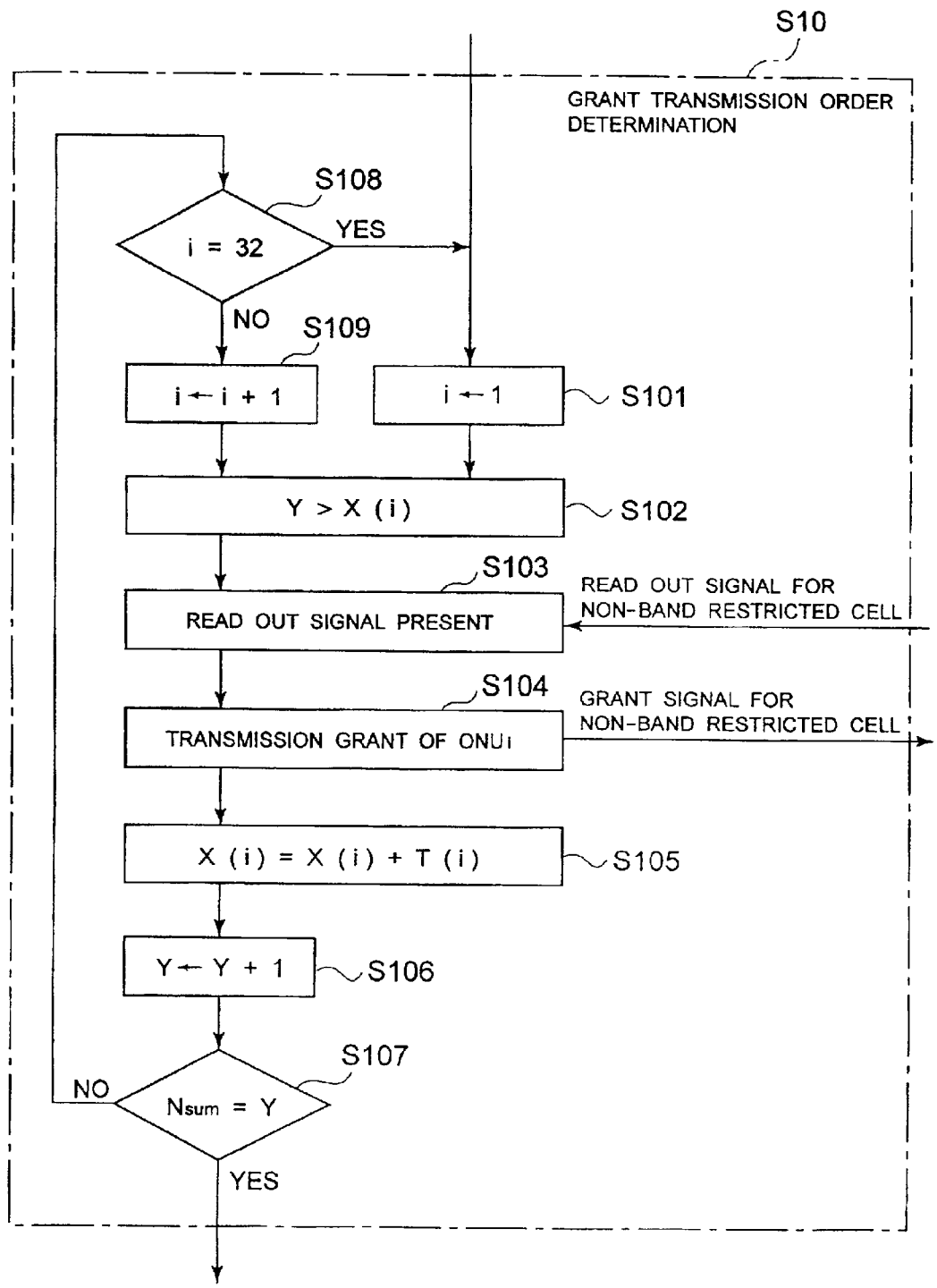
FIG. 24 is a flowchart showing a detailed process operation of a grant transmitting order determining process of FIG. 19.
Figure 25:
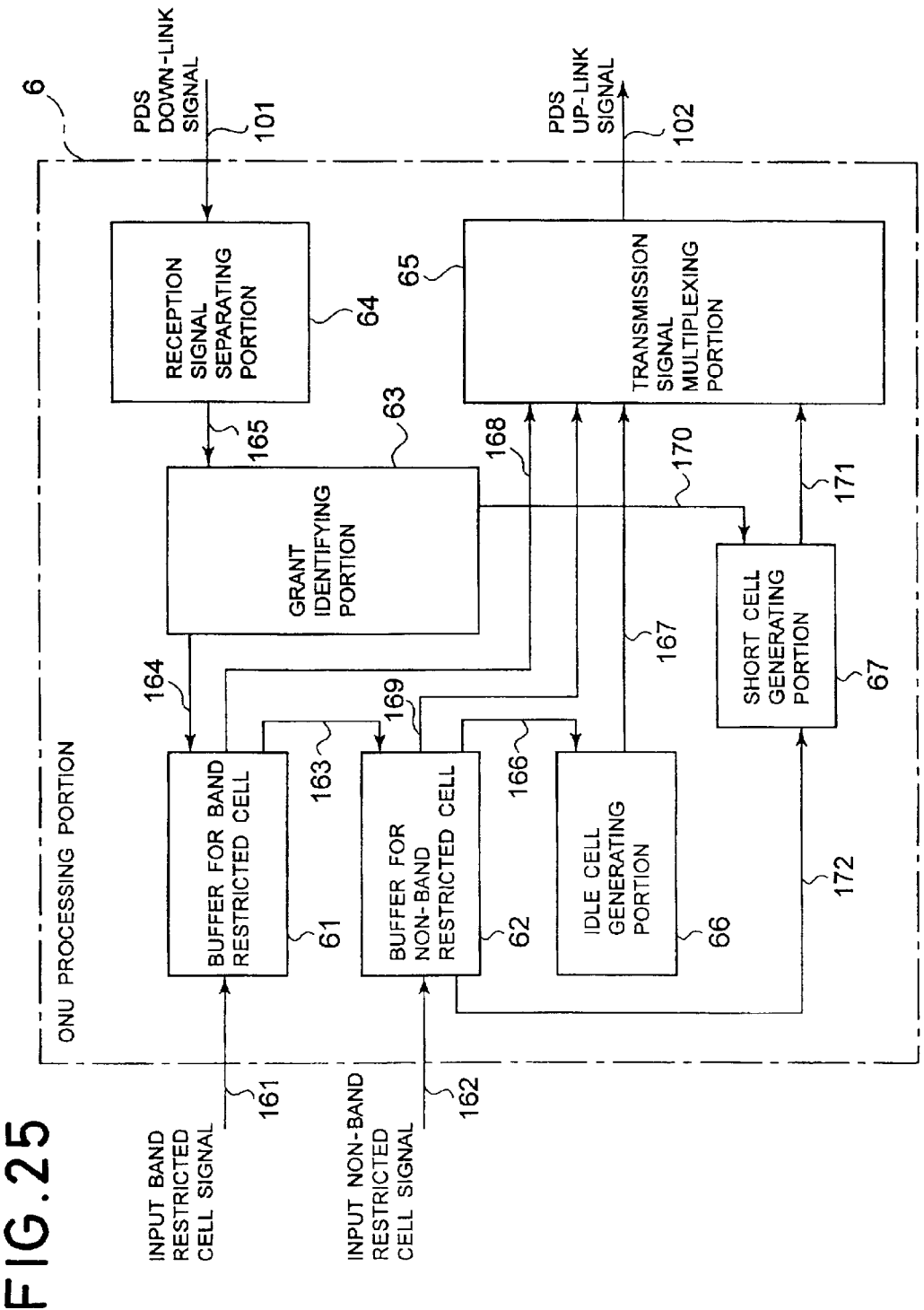
FIG. 25 is a block diagram showing a construction of the ONU processing portion in prior art.
Figure 26:
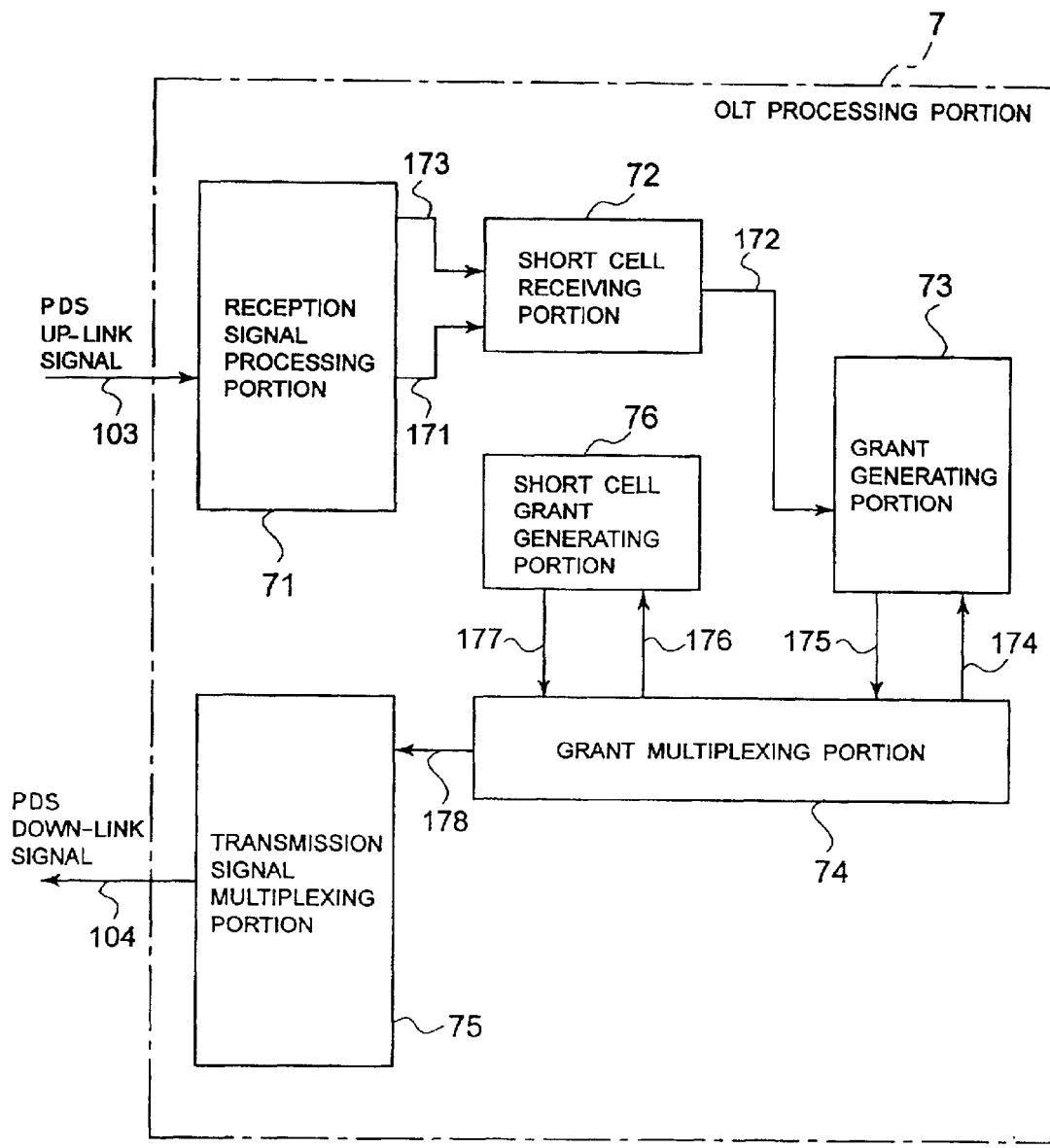
FIG. 26 is a block diagram showing a construction of the OLT processing portion in prior art.

FIG. 19 is a flowchart showing a detailed process operation of a grant generating portion 54 for non-band restricted cell of FIG. 17, FIG. 20 is a flowchart showing a detailed process operation of updating procedure of FIG. 19, FIG. 21 is a flowchart showing a detailed process operation of a weighting determination process of FIG. 19, FIG. 22 is a flowchart showing a detailed process operation of an updating period determination process of FIG. 19, FIG. 23 is a flowchart showing a detailed process operation of a transmission period determination process of FIG. 19 and FIG. 24 is a flowchart showing a detailed process operation of a grant transmitting order determining process of FIG. 19.

The shown embodiment of the present invention is directed to the case where the short cell is used as different from the former embodiment of the invention. Hereinafter, different of the shown embodiment of the present invention from the former embodiment of the invention will be discussed. As a necessary function for effectively using the bands, as a function sending the short cell grant only as required, the shown embodiment of the present invention assigns the extra band per each ONU constantly, and as a function for monitoring the idle cell, the grant generating portion 54 for non-band restricted cell, the idle cell detecting portion 55 and the short cell grant generating portion are provided.

In the condition where the cell to feed is present in the ONU processing portion 4, the idle cell is fed from the idle cell generating portion 46. In the OLT processing portion 5, for the grant assigned for the extra cells, absence of the idle cell indicates that extra area is lacking. Namely, number of cells which the ONU can not feed, can be detected instantly by monitoring the idle cell. Also, by feeding the short cell, the accumulation amount can be recognized, feeding of the short cell can be started.

Process operation will be discussed in detail with reference to the process flow of the grant generating portion 54 for non-band restricted cell shown in FIGS. 19 to 24. The process flow is consisted of five parts of updating procedure (step S6 of FIG. 19 and steps S61, S62 of FIG. 20), weight determination (step S7 of FIG. 19 and steps S71 to S78 of FIG. 21), updating period determination (step S8 of FIG. 19 and steps S81 to S85 of FIG. 22), feeding period determination per ONU identification number (step S9 of FIG. 19 and steps S91 to S95 of FIG. 23) and grant feeding order determination (step S10 of FIG. 19 and steps S101 to S109 of FIG. 24).

The updating procedure reads out number of grant demand input from the short cell receiving portion 52 during updating period per ONU identification number and accumulates the number of grant demand. Weight determination determines number of assigned grant according to a preliminarily input weighting function for variation amount of the demand number of preceding ONU identification number and the demand number of the current ONU identification number. At this time, process is performed to assign such that at least one or more cells are assigned per the ONU identification number.

Determination of the updating period determines updating period of the grant for the non-band restricted cell from the grant per ONU identification number. The transmission period determination per ONU identification number is determined as an individual transmission period from number of grant per ONU identification number relative of the updating period. The grant transmission order determination transmits the grant signal 159 for non-band restricted cell for the grant read out signal 158 for non-band restricted cell.

Overall process is stopped the operation in response to the grant read out signal 158 for non-band restricted cell. For one grant read out signal 158 for non-band restricted cell, one grant is fed as the grant signal 159 for non-band restricted cell. Then, next grant is determined to wait for inputting of the grant read out signal 159 for non-band restricted cell.

As set forth above, since the band can be varied at high speed in the PDS, statistical multiplexing effect can be enhanced in terms of the traffic of the subscriber presenting in the physically distant sites.

On the hand, by performing the process for the cells requiring band restriction and the cells not requiring band restriction separately, the process for the cells not requiring the band restriction can be simplified to enable speed up. Furthermore, by preliminarily assigning the extra bands and monitoring decreasing of the idle cell, necessary band can be recognized instantly to accommodate response delay up to a band variation timing. Furthermore, increasing and decreasing of use ratio of the extra band is estimated as a function to determine assignment of next grant. Thus, variation of band can be done at high speed.

On the other hand, since the acceptance is not preliminarily performed for the packet which is not possible to process, when the packet process is performed by the OTL, number of packet should be finite number in most case. This is because that the identifier of the IP packet can be possible greater in number than the number of the identifier of the ATM cells, and total number of the ATM cell is restricted in view of the cost. Therefore, even if the packets are accepted on the side of the OLT in excessive number, it simply waist the band of the PDS and cannot be processed.

Also, even when the short cell is not present, dynamic band assignment can be possible with monitoring the idle cell. Therefore, it is possible to feed the short cell only as required to make it unnecessary to regularly perform polling. As the result, the fand of the up-link in the PDS section is effectively used.

Furthermore, number of grant for next assignment can be varied using function for increasing and decreasing of the idle cells or increasing or decreasing of cell accumulation amount in the ONU, it facilitates adaptation for variation of the traffic type. Furthermore, since the band can be varied at high speed, it becomes possible to design the buffer of ONU with smaller or reduced number.

As set forth above, with the present invention, it becomes possible to vary the band at high speed, to effectively use the up-link band in the PDS section and to adapt to variation of the traffic type by monitoring increasing and decreasing of the idle cell, recognizing accumulation of the cell in the ONU processing portion depending upon the result of monitoring and individually handling the band process in the optical communication network according to necessary and unnecessary of the band restriction by the traffic type.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A passive optical network transmission system comprising:

a plurality of subscriber units including optical network unit processing portions for terminating an optical communication network;

a station unit including optical line terminal processing portion terminating said optical communication network;

wherein said optical line terminal processing portion comprises grant generating means for generating transmission permission for a cell of an unspecified bit rate traffic type by assigning extra band constantly;

wherein each of said optical network units comprises buffer means for storing said cell of the unspecified bit rate traffic type, and idle cell generating means for generating an idle cell for inserting in said extra band;

wherein said optical line terminal processing portion comprises monitoring means for monitoring increasing and decreasing of said idle cells; and means for individually handling bandwidth assignment in said optical communication network according to said unspecified bit rate traffic or a constant bit rate traffic.

2. A passive optical network transmission system as set forth in claim 1, wherein said optical line terminal processing portion further comprises means for rejecting packet which cannot be processed.

3. A passive optical network transmission system as set forth in claim 1, wherein said optical line terminal processing portion further comprises means for discriminating the transmission permission for permitting individual process of said unspecified bit rate traffic and said constant bit rate traffic.

4. A passive optical network transmission system as set forth in claim 3, wherein said optical line terminal processing portion further comprises means for setting weighting function for estimating variation of said traffic.

5. A passive optical network transmission system as set forth in claim 1, wherein said optical line terminal includes means for notifying said subscriber unit stopping transmission for packet information.

6. A dynamic band assignment method in a passive optical network transmission system including a plurality of subscriber units including optical network unit processing portions for terminating an optical communication network and a station unit including optical line terminal processing portion terminating said optical network, comprising:

generating transmission permission for a cell of an unspecified bit rate traffic type by assigning extra band constantly in said optical line terminal processing unit;

storing said cell of the unspecified bit rate traffic type in a buffer in said each of said optical network unit;

generating an idle cell for inserting in said extra band in said each of said optical network unit;

monitoring increasing and decreasing of said idle cells in said optical line terminal processing portion; and individually handling bandwidth assignment in said optical communication network according to said unspecified bit rate traffic or a constant bit rate traffic.

7. A dynamic band assignment method as set forth in claim 6, which further comprises a step of rejecting packet which cannot be processed.

8. A dynamic band assignment method as set forth in claim 6, wherein said optical line terminal processing portion performs process comprising the step of discriminating the transmission permission for permitting individual process of said unspecified bit rate traffic and said constant bit rate traffic.

9. A dynamic band assignment method as set forth in claim 8, wherein said optical line terminal processing portion performs process comprising the step of setting weighing function for estimating variation of said traffic.

10. A dynamic band assignment method as set forth in claim 6, wherein said optical line terminal processing portion performs process comprising the steps of notifying said subscriber unit stopping transmission for packet information.

* * * * *

UNITED STATES PATENT AND TRADEMARK OFFICE
CERTIFICATE OF CORRECTION

PATENT NO. : 6,931,013 B2
APPLICATION NO. : 09/760775
DATED : August 16, 2005
INVENTOR(S) : Saikusa It is certified that error appears in the above-identified patent and that said Letters Patent is hereby corrected as shown below:

Col. 2, Line 28, delete "complicate" insert --complicated--
Col. 2, Line 44, delete "process", insert --processed--
Col. 3, Line 44, delete "process", insert --processed--
Col. 4, Line 1, delete "case", insert --cases--
Col. 4, Line 2, delete "possible", insert --possibly--
Col. 4, Line 5, delete "it", insert --if--
Col. 4, Line 7, delete "waist", insert --wastes--
Col. 4, Line 34, delete "includes", insert --include--
Col. 7, Line 56, delete "represents", insert --represent--
Col. 9, Line 25, delete "are", insert --is--
Col. 10, Line 43, delete "respetive", insert --respective--
Col. 10, Line 44, delete "accoding", insert --according--
Col. 14, Line 63, after "On the", insert --other--
Col. 15, Line 10, delete "case", insert --cases--
Col. 15, Line 11, delete "possible", insert --possibly--
Col. 15, Line 15, delete "waist", insert --waste--
Col. 15, Line 21, delete "fand", insert --band--

Signed and Sealed this

Thirtieth Day of September, 2008

JON W. DUDAS
*Director of the United States Patent and Trademark Office*